United States Patent
Park et al.

(10) Patent No.: US 11,677,138 B2
(45) Date of Patent: Jun. 13, 2023

(54) COVER DEVICE FOR OPTIMAL BEAM IMPLEMENTATION OF ANTENNA IN WIRELESS COMMUNICATION SYSTEM

(71) Applicant: SAMSUNG ELECTRONICS CO., LTD., Suwon-si (KR)

(72) Inventors: Sanghoon Park, Suwon-si (KR); Juneseok Lee, Suwon-si (KR); Dohyuk Ha, Suwon-si (KR); Jungyub Lee, Suwon-si (KR); Jinsu Heo, Suwon-si (KR); Youngju Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 250 days.

(21) Appl. No.: 17/108,157

(22) Filed: Dec. 1, 2020

(65) Prior Publication Data

US 2021/0203062 A1 Jul. 1, 2021

(30) Foreign Application Priority Data

Dec. 27, 2019 (KR) .......................... 10-2019-0176932

(51) Int. Cl.
*H01Q 1/42* (2006.01)
*H01Q 1/24* (2006.01)
(Continued)

(52) U.S. Cl.
CPC .......... *H01Q 1/246* (2013.01); *H01Q 1/1271* (2013.01); *H01Q 1/42* (2013.01); *H01Q 21/064* (2013.01);
(Continued)

(58) Field of Classification Search
CPC .... H01Q 1/246; H01Q 1/1271; H01Q 21/245; H01Q 21/064; H01Q 21/065
See application file for complete search history.

(56) References Cited

U.S. PATENT DOCUMENTS

| 5,333,000 A | * | 7/1994 | Hietala | ...................... G02F 2/02 342/368 |
| 2003/0122727 A1 | | 7/2003 | Koshizaka et al. | |

(Continued)

FOREIGN PATENT DOCUMENTS

| CN | 2676568 Y | * | 2/2005 | ............... H05K 1/18 |
| CN | 101978490 A | * | 2/2011 | ......... H01L 23/3121 |

(Continued)

OTHER PUBLICATIONS

International Search Report dated Mar. 8, 2021 in corresponding International Application No. PCT/KR2020/017290.

(Continued)

*Primary Examiner* — Joseph J Lauture
(74) *Attorney, Agent, or Firm* — Nixon & Vanderhye P.C.

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. Disclosed is a cover device configured to protect an antenna device embedded in an electronic device to radiate a beam of an ultra-high frequency band, the cover device including: a cover frame including a window area corresponding to a radiation area of the antenna device; and a functional structure disposed in the window area on the cover frame and having a stacked structure comprising one or more functional layers.

20 Claims, 25 Drawing Sheets

(51) Int. Cl.
  *H01Q 1/12*   (2006.01)
  *H01Q 21/06*  (2006.01)
  *H01Q 21/24*  (2006.01)

(52) U.S. Cl.
  CPC ......... *H01Q 21/065* (2013.01); *H01Q 21/245* (2013.01)

(56) References Cited

U.S. PATENT DOCUMENTS

| | | |
|---|---|---|
| 2014/0361945 A1 | 12/2014 | Misra et al. |
| 2015/0116291 A1* | 4/2015 | Leung .................. G06F 3/0383 345/179 |
| 2016/0254589 A1 | 9/2016 | Ju et al. |
| 2018/0337445 A1* | 11/2018 | Sullivan .................. H01Q 1/36 |
| 2019/0207302 A1 | 7/2019 | Yamada |
| 2019/0333881 A1* | 10/2019 | Chen .................. H01Q 1/2283 |

FOREIGN PATENT DOCUMENTS

| | | |
|---|---|---|
| CN | 102723597 | 10/2012 |
| EP | 3 490 058 A1 | 5/2019 |
| JP | 07221527 | 8/1995 |
| KR | 10-1041852 | 6/2011 |
| KR | 10-1339020 | 12/2013 |
| KR | 10-1887891 | 8/2018 |

OTHER PUBLICATIONS

Extended European Search Report dated Nov. 30, 2022 for EP Application No. 20905614.2.

* cited by examiner

COVER DEVICE FOR OPTIMAL BEAM IMPLEMENTATION OF ANTENNA IN WIRELESS COMMUNICATION SYSTEM

CROSS-REFERENCE TO RELATED APPLICATION

This application is based on and claims priority under 35 U.S.C. § 119 to Korean Patent Application No. 10-2019-0176932, filed on Dec. 27, 2019, in the Korean Intellectual Property Office, the disclosure of which is incorporated by reference herein in its entirety.

BACKGROUND

1) Field

The disclosure relates to a cover device for optimal beam implementation of an antenna of a single band or multiple bands.

2) Description of Related Art

To meet the demand for wireless data traffic having increased since deployment of 4G communication systems, efforts have been made to develop an improved 5th generation (5G) or pre-5G communication system. The 5G or pre-5G communication system may also be referred to as a 'Beyond 4th generation (4G) Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency shift keying (FSK) and quadrature amplitude modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which may refer, for example, to a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

As described above, due to sensitivity to radio environments in ultra-high frequency bands, it is necessary, when base stations are implemented in a 5G communication system, to review various factors ranging from the material of covers to the thickness thereof in advance.

Particularly, currently used covers for ultra-high frequency bands are sensitive to the permittivity and dielectric loss of the material used for the covers, and it is thus necessary to optimize the material and thickness of the covers according to the frequency band of beams emitted from antennas. That is, when base stations are implemented in an existing 5G communication system supporting ultra-high frequency bands, the optimized material or thickness of covers may vary depending on each frequency band. As a result, cover molds having the material or thickness optimized for each frequency band are fabricated, respectively.

The above information is presented as background information only to assist with an understanding of the disclosure. No determination has been made, and no assertion is made, as to whether any of the above might be applicable as prior art with regard to the disclosure.

SUMMARY

Embodiments of the disclosure relate to a cover device having a functional structure which has a material optimized for a single- or multi-frequency band, and which is positioned on a cover frame fabricated using a common mold, such that the same can have an optimal performance flexibly for each of various frequency bands.

Embodiments of the disclosure may provide a functional structure that may have one or more functional layers implemented in a multilayered form such that the same can be implemented as a structure that minimizes and/or reduces distortion of beams from a single antenna or multiple antennas capable of controlling at least one of strength, permittivity, magnetic permeability, or conductivity.

An example embodiment of the disclosure provides a cover device for protecting an antenna device embedded in an electronic device to radiate a beam of an ultra-high frequency band, the cover device including: a cover frame including an open window area corresponding to a radiation area of the antenna device; and a functional structure disposed in the window area on the cover frame and having a stacked structure including one or more functional layers.

An example embodiment of the disclosure provides a cover device for protecting an antenna device embedded in an electronic device to radiate a beam of an ultra-high frequency band, the cover device including: a cover frame corresponding to a radiation area of the antenna device and including a first area having a predetermined thickness; and a functional structure disposed in the first area on the cover frame and having a stacked structure including one or more functional layers.

A cover device according to various example embodiments may include a functional structure having a stacked structure including one or more functional layers capable of minimizing and/or reducing distortion of beams in a single- or multi-frequency band emitted from an antenna device.

A cover device according to various example embodiments may include a functional structure having one or more functional layers implemented in a multilayered form such that at least one of strength, permittivity, magnetic permeability, or conductivity can be controlled. Accordingly, the same may have a material optimized for a single- or multi-frequency band. As a result, there may be no need to implement a cover device using a separate mold such that the same has a material or thickness optimized for each frequency band as in the prior art.

Accordingly, a cover device according to various example embodiments may have a functional structure positioned on a cover frame, the functional structure having a stacked structure including one or more functional layers, such that the same includes a material optimized for a single- or multi-frequency band having a predetermined thickness without having to fabricate a new mold for an antenna cover device having a material or thickness optimized for each frequency band when base stations having the same exterior are implemented. As a result, distortion of beams in a single- or multi-frequency band radiated from the antenna device can be minimized and/or reduced.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
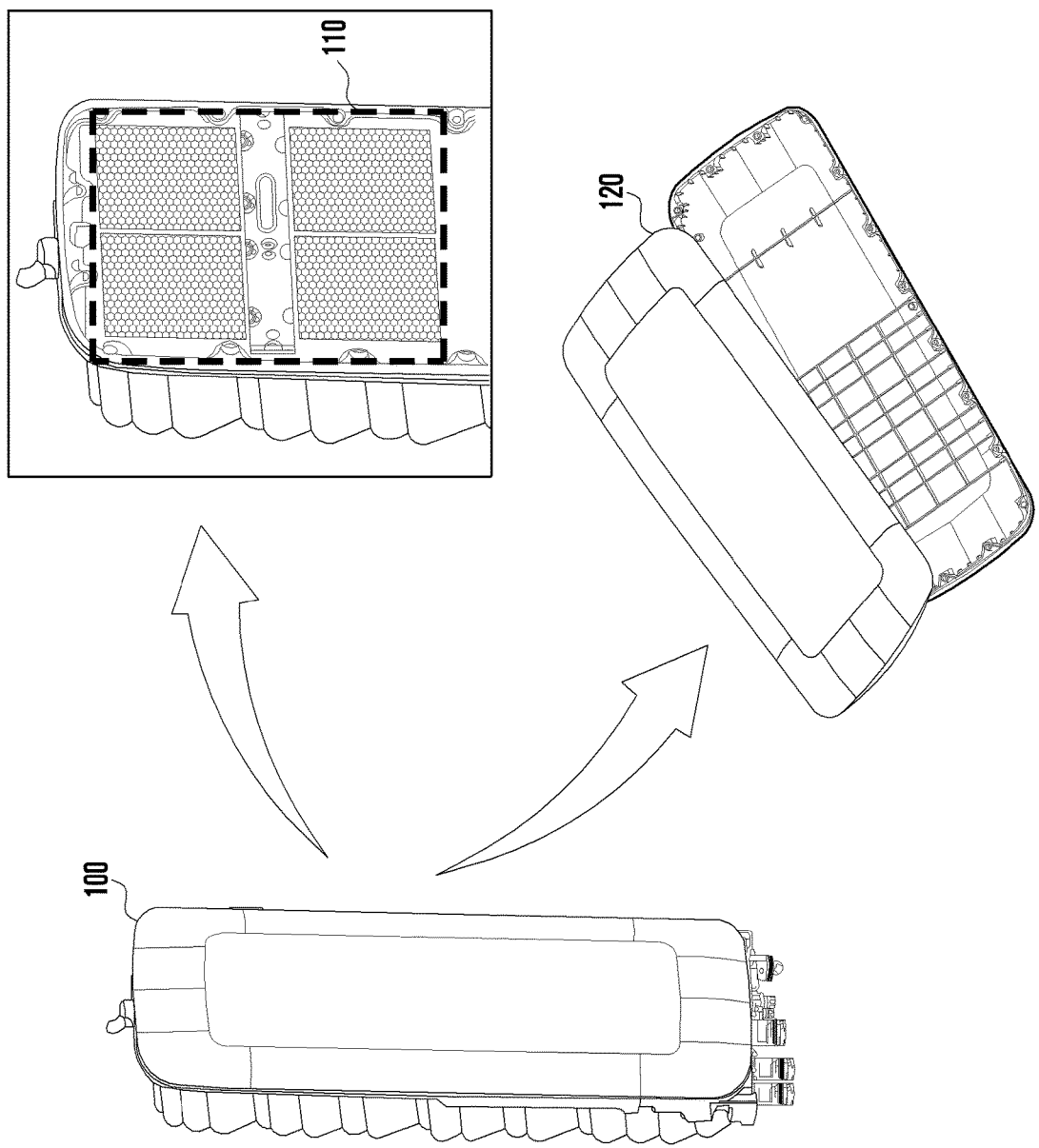
FIG. 1 is a diagram illustrating a base station device for an ultra-high frequency band.

Various example embodiments of the disclosure will be described in greater detail below in conjunction with the accompanying drawings. However, the disclosure is not limited to the example embodiments set forth below, and may be implemented in various different forms. Throughout the disclosure, the same or like reference numerals designate the same or like elements.

In the following description of the disclosure, a detailed description of known functions or configurations incorporated herein may be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the disclosure.

FIG. 1 is a diagram illustrating a base station device for an ultra-high frequency band.

As illustrated in FIG. 1, a base station device 100 may include an antenna device 110 configured to radiate a beam of an ultra-high frequency band to the interior of a base station, and a cover device 120 configured to protect the antenna device 110 from an external environment.

Figure 2:
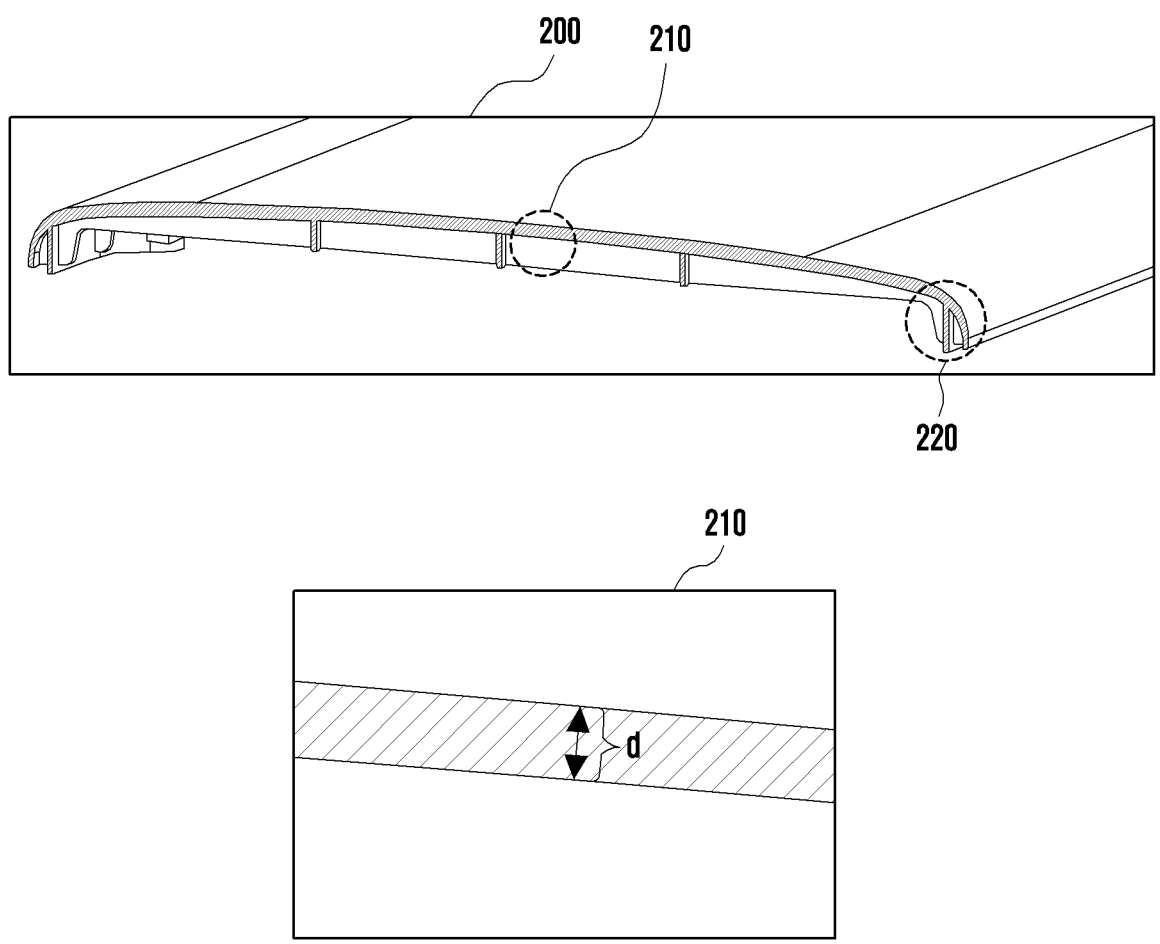
FIG. 2 is a diagram illustrating the material or a thickness of an antenna cover device.

FIG. 2 is a diagram illustrating the material or the thickness of an antenna cover device.

As described above, a 5G communication system is sensitive to an electric wave environment at an ultra-high frequency band, and thus it is necessary to variously review both the material and the thickness of a cover in advance when a base station is implemented.

For example, because the cover device for an ultra-high frequency band is sensitive to the permittivity and the dielectric loss of the material of a cover even in the case of the same external shape when a base station is implemented, It is necessary to optimize the material and the thickness of the cover device according to the band of an antenna. That is, the material or the thickness of the cover device that is optimized for frequency bands when a base station is implemented in a 5G system that currently supports an ultra-high frequency band may become changed, and thus cover molds having materials or thicknesses that are optimized for frequency bands are manufactured, respectively.

According to various embodiments, the characteristics of the optimal thickness and the optimal material of an antenna cover device that minimizes and/or reduces distortion of a beam radiated from an antenna device may be changed according to a frequency band.

In the cover device having the same thickness according to various embodiments, the characteristics of the material that minimizes and/or reduces distortion of a beam may be changed according to a frequency band.

As illustrated in FIG. 2, in the cover device having a predetermined thickness d, the characteristics of the material that minimizes and/or reduces distortion of a beam may be changed according to a frequency band.

The characteristics of the materials of the cover device 200 may be different when the frequency band of a beam radiated from the antenna device embedded in the base station device is 28 GHz and 39 GHz.

The characteristic of the material according to various embodiments may include one or more characteristics of the strength, the permittivity, the magnetic permeability, or the conductivity.

The characteristics of the material of the cover device that are optimal according to the frequency band of a beam radiated from the antenna device described in the disclosure pertain to an embodiment derived according to various simulation results, and the disclosure is not limited thereto.

In the cover device having characteristics of the same material according to the disclosure, the thickness that minimizes and/or reduces distortion of a beam may be changed according to a frequency band.

For example, as illustrated in FIG. 2, the optimal thickness d of the cover device may be 3.5 mm when the frequency band of a beam radiated from the antenna device embedded in the base station device is 28 GHz, and the optimal thickness d of the cover device 200 having characteristics of the same material may be 2.5 mm when the frequency band of the beam is 39 GHz.

The thickness of the cover device that is optimal according to the frequency band of a beam radiated from the antenna device described in the disclosure pertains to an embodiment derived according to various simulation results, and the disclosure is not limited thereto.

Conventionally, cover devices for ultra-high frequency bands are produced for respective bands only by manufacturing molds of the cover devices having optimal thicknesses corresponding to the optimal materials for the frequency bands.

For example, when the materials of the cover devices are the same, it is necessary to manufacture a radome mold for 28 GHz having a thickness of 3.5 mm, a radome mold for 39 GHz having a thickness of 2.5 mm, and the like, respectively.

As illustrated in FIG. 2, the thickness of a central portion 210 of the cover device 200 may be different from or the same as the thickness of a side surface part 220 of the cover device 200.

Figure 3:
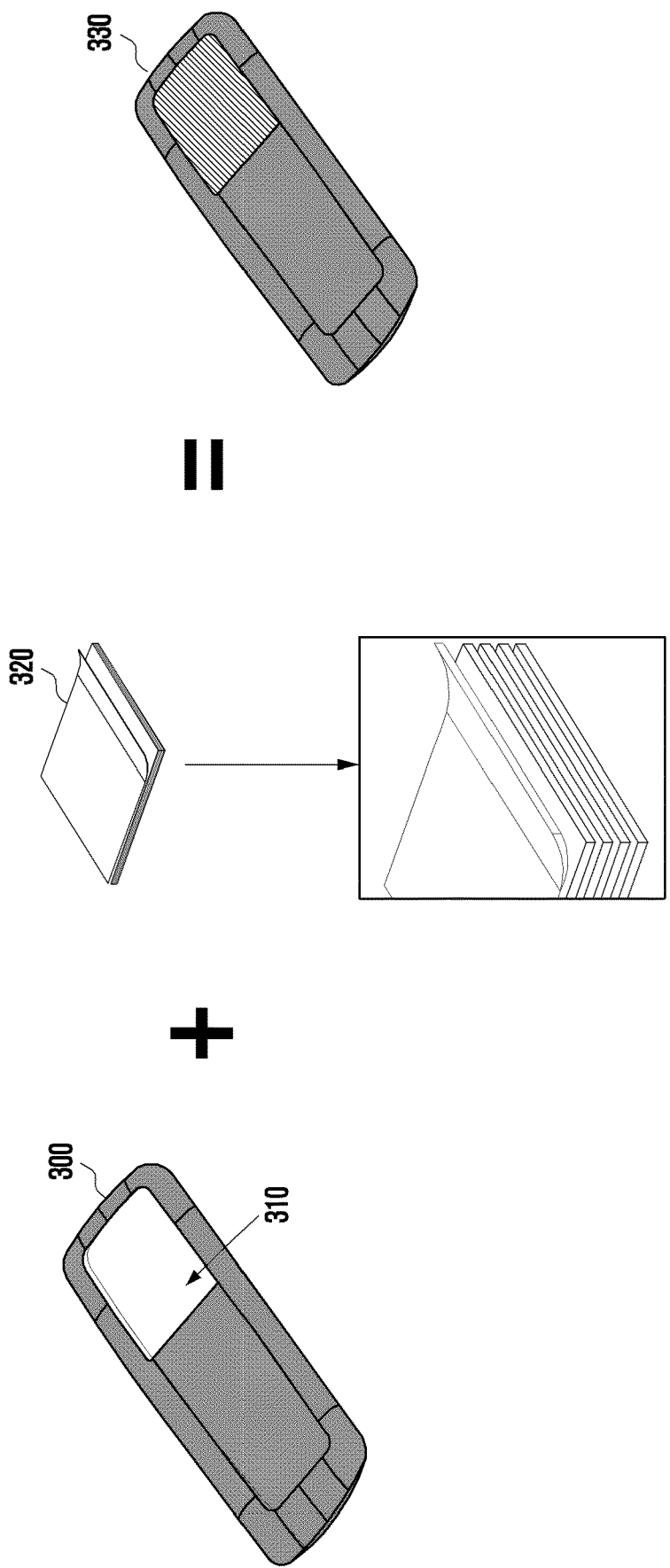
FIG. 3 is a diagram illustrating an example in which a functional structure is located in a cover frame according to various embodiments.

FIG. 3 is a diagram illustrating examples in which a functional structure is located in a cover frame according to various embodiments.

As illustrated in FIG. 3, a cover frame 300 according to an embodiment may include an opened window area 310.

The window area 310 according to an embodiment may correspond to a radiation area of the antenna in the base station device, and may be changed according to the location and the extent of the antenna device embedded in the base station device. For example, the window area may be located in at least one area of an upper end portion, a lower end portion, a front surface portion, and a side surface portion of the cover frame. This will be described in greater detail below with reference to FIGS. 4, 5 and 6.

Figure 21A:
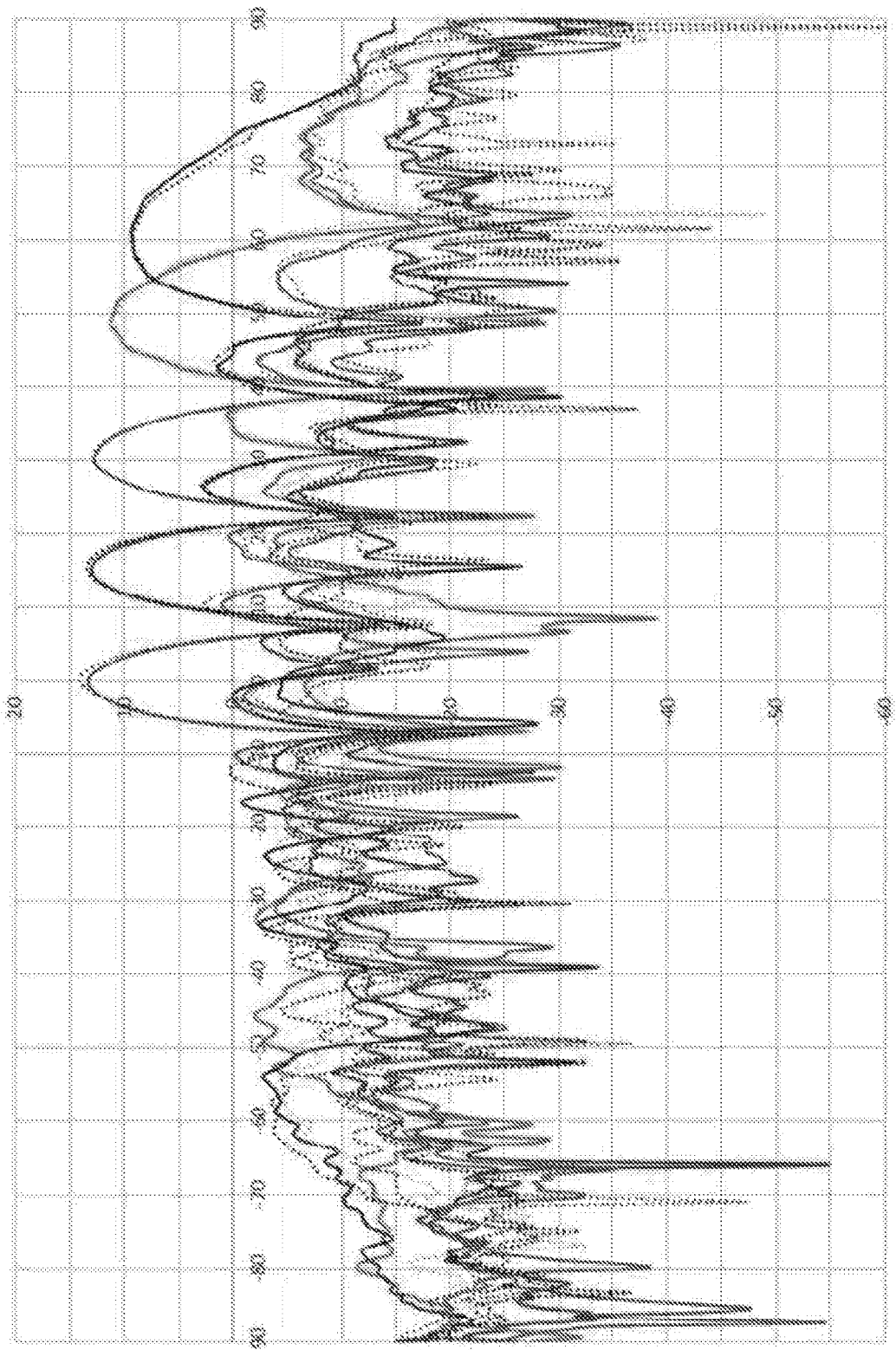
FIG. 21A is a diagram illustrating an example simulation result of antenna gains measured at different frequency bands when a cover device including a functional structure is used according to various embodiments.
Figure 21B:
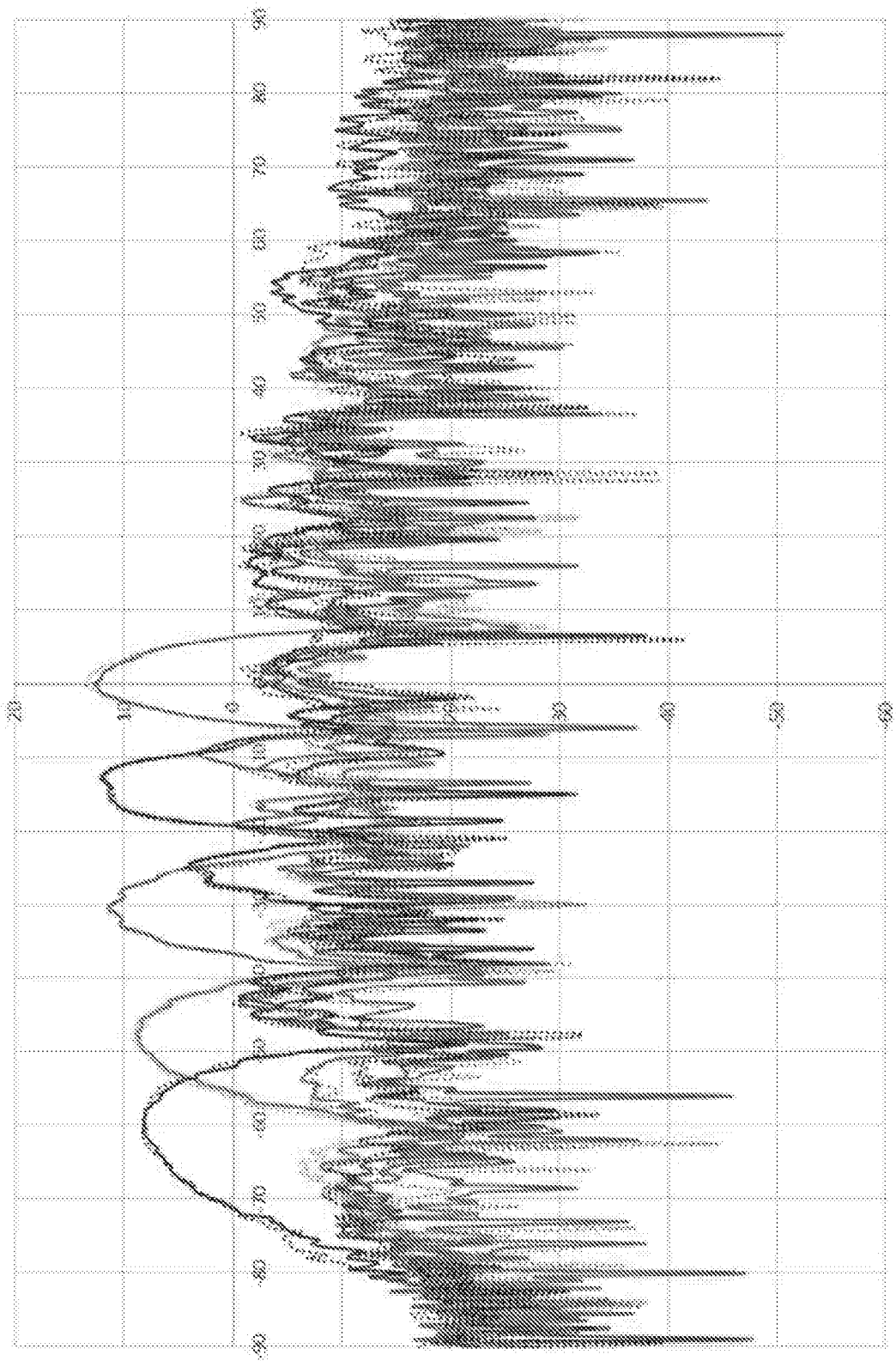
FIG. 21B is a diagram illustrating an example simulation result of antenna gains measured at different frequency bands when a cover device including a functional structure is used according to various embodiments.

As illustrated in FIG. 3, a functional structure 320 of a stacked structure including one or more functional layers may be located in the opened window area 310 located in the cover frame 300 according to an embodiment, whereby a cover device 330 having characteristics of a material that is optimized for a single frequency band or multiple frequency bands may be implemented. For example, the functional structure 320 can minimize and/or reduce distortion of a beam radiated from the antenna device embedded in the base station device as illustrated in FIGS. 21A and 21B below even when the frequency band of the beam is 28 GHz or 39 GHz.

Accordingly, in the cover device according to various embodiments, by locating the functional structure having characteristics of the material that is optimized for a single frequency band or multiple frequency bands in one cover frame, the cover devices for frequency bands may be implemented by one device or shared when the base station having the same external shape is implemented.

Figure 4:
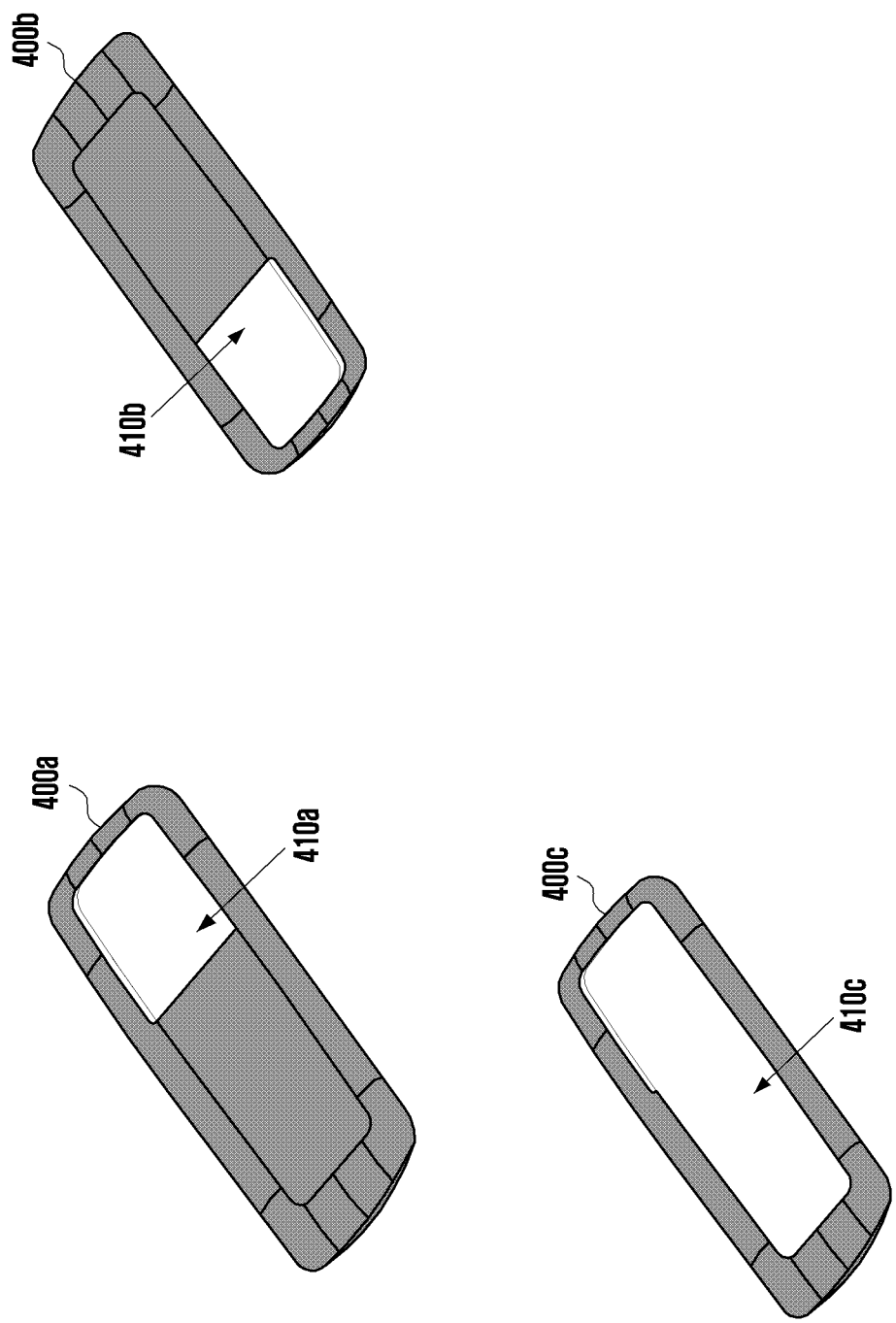
FIG. 4 is a diagram illustrating various example cover frames according various embodiments.
Figure 5:
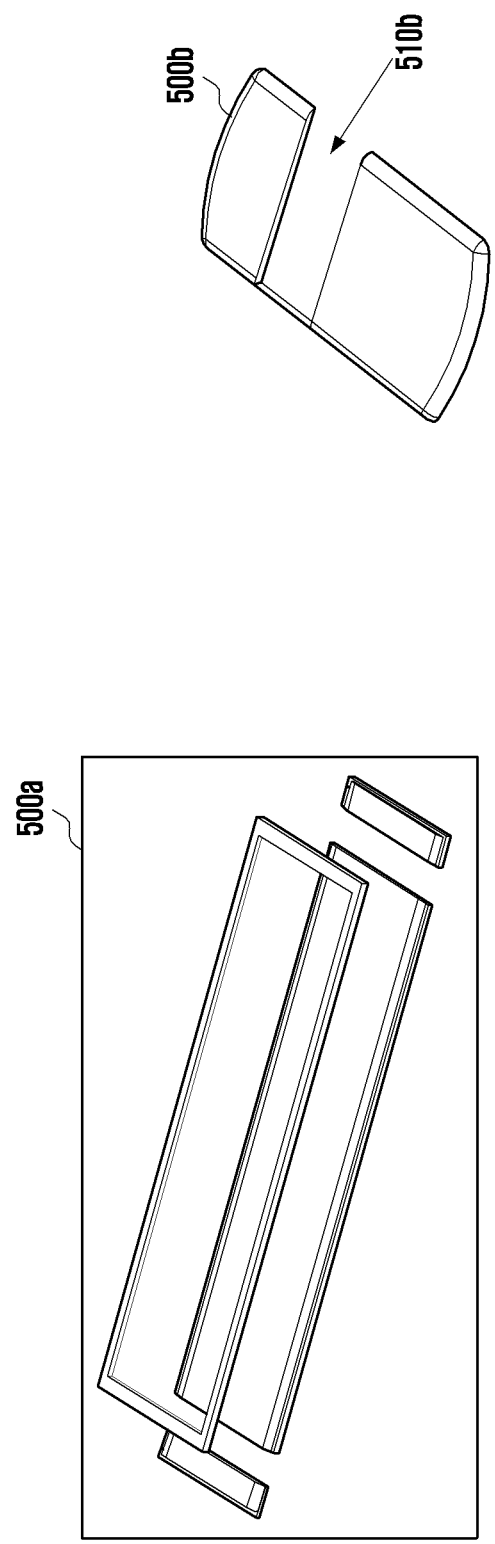
FIG. 5 is a diagram illustrating various example cover frames according to various embodiments.

FIG. 4 is a diagram illustrating various example cover frames according to various embodiments, and FIG. 5 is a diagram illustrating various example cover frames according to various embodiments.

As illustrated in FIG. 4, cover frames of various structures are present according to the location and the size of the opened window area.

The window area 310 included in the cover frame according to an embodiment may correspond to a radiation area of the antenna in the base station device, and may be changed according to the location and the extent of the antenna device embedded in the base station device.

For example, as illustrated in FIG. 4, when an antenna device is embedded at an upper end of the base station device, a window area 410a is opened at an upper end of the cover frame 400a for an upper end antenna. When the antenna device is embedded at a lower end of the base station device, a window area 410*b* is opened at a lower end of the cover frame 400*b* for a lower end antenna.

When the antenna device is embedded on a front surface of the base station device, a window area 410*c* is opened on a front surface of the cover frame 400*c* for a front surface antenna.

With reference to FIG. 5, a front surface assembled cover frame 500*a* may be used when the antenna device is embedded on a front surface of the base station device. This will be described in greater detail below with reference to FIG. 6.

Further, as illustrated in FIG. 5, when the antenna device is embedded on a side surface of the base station device as illustrated in FIG. 5, an opened window area 510*b* may be located on a side surface of the cover frame 500*b*.

Figure 6:
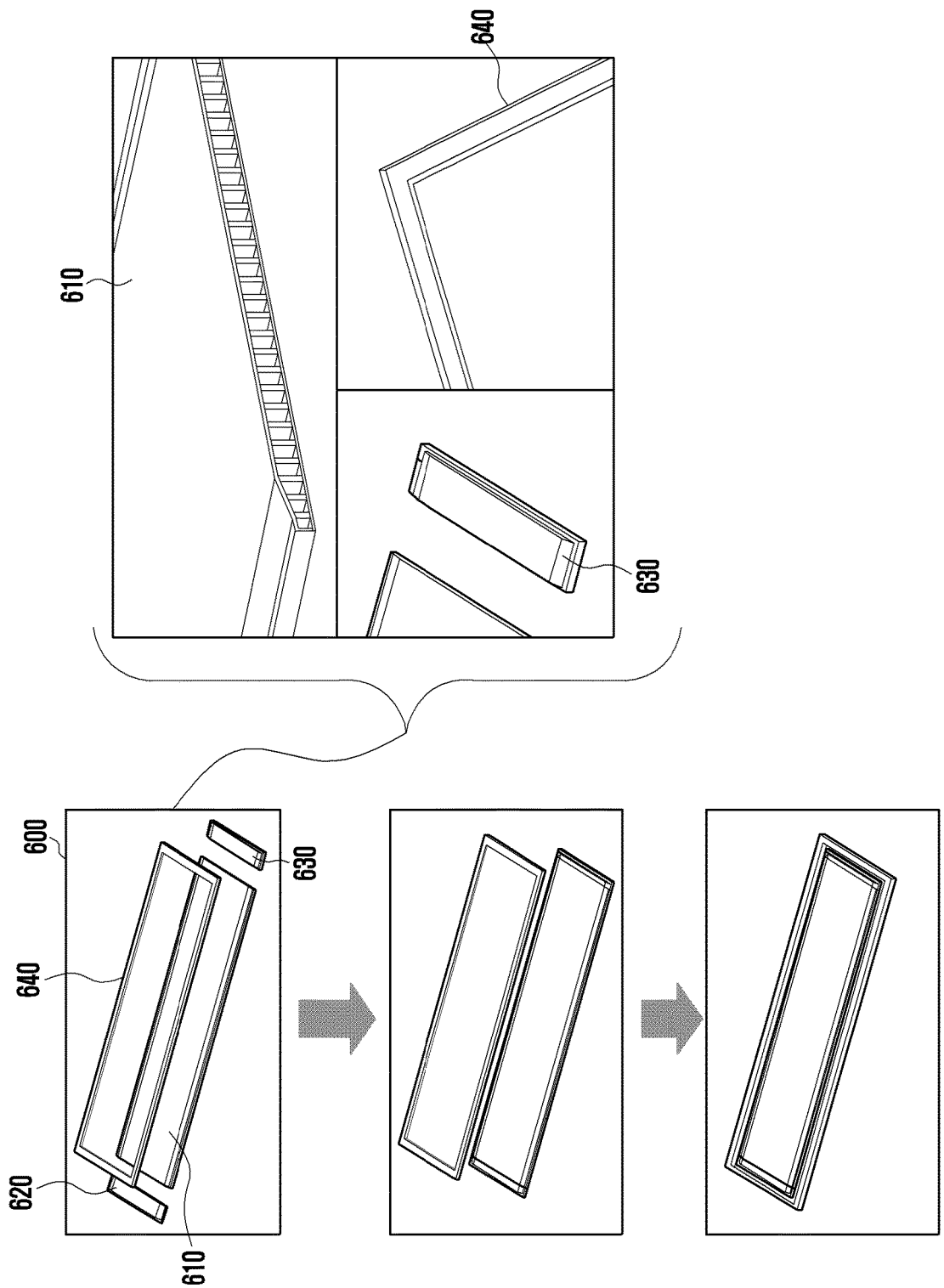
FIG. 6 is a diagram illustrating an example of assembling a front surface assembled cover frame according to various embodiments.

FIG. 6 is a diagram illustrating an example of assembling a front assembled cover frame according to various embodiments.

The front surface assembled cover frame 600 according to various embodiments may directly act as a cover device using an assembly concept.

As illustrated in FIG. 6, the front surface assembled cover frame 600 may include a panel 610, first coupling parts 620 and 630, and a second coupling part 640.

For example, the panel 610 may include a structure such as a functional structure, and may have a flat plate reinforcing structure having a periodic pattern. Various embodiments for the structure will be described in greater detail below with reference to FIGS. 7 and 8.

As illustrated in FIG. 6, the first coupling parts 620 and 630 may be coupled to the side surface part of the panel, and the second coupling part 640 may be coupled to the panel, to which the first coupling parts are coupled.

Figure 7:
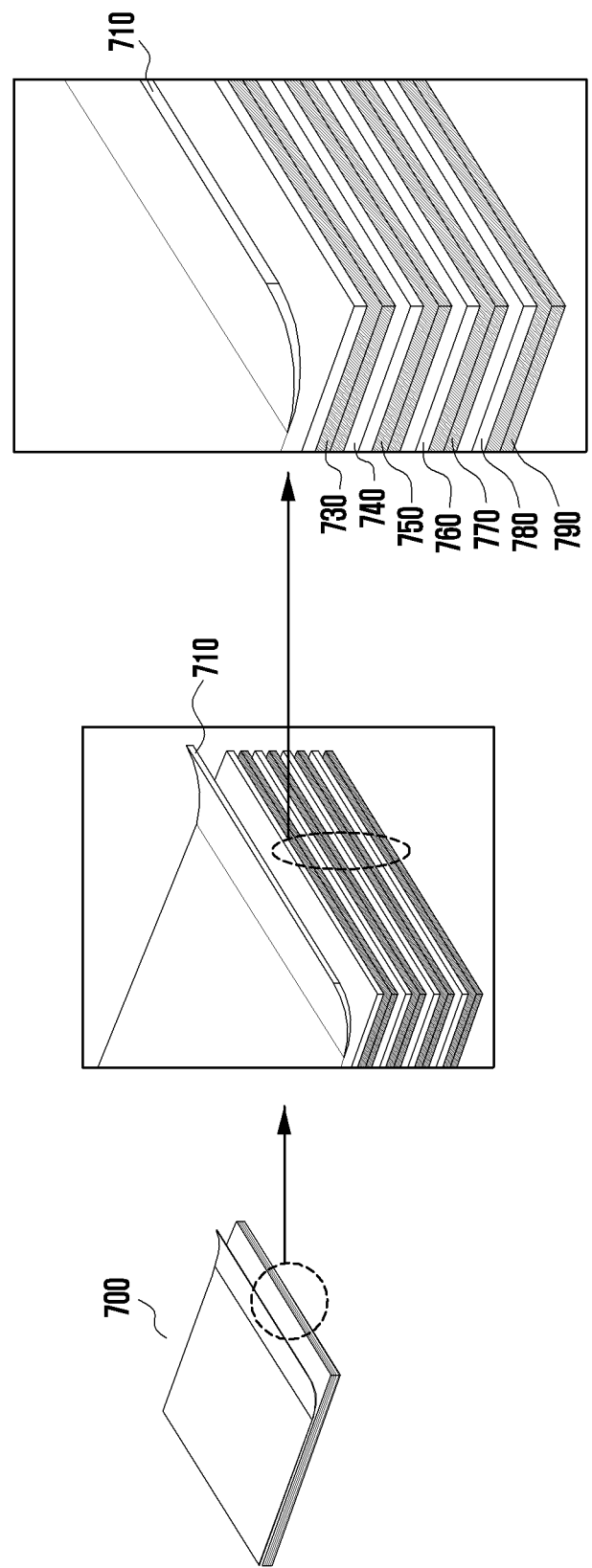
FIG. 7 is a diagram illustrating an example functional structure including one or more functional layers according to various embodiments.

FIG. 7 is a diagram illustrating an example functional structure including one or more functional layers according to various embodiments.

The functional structure according to various embodiments may be a stacked structure, in which one or more functional layers are implemented in a multilayered form.

As illustrated in FIG. 7, the one or more functional layers 710, 730, 740, 750, 760, 770, 780, and 790 included in the functional structure 700 may include at least one of a thermoplastic material, a thermosetting material, or an inorganic material. In addition, the functional structure according to various embodiments may be a single material or a complex material.

The functional layers that are layers of the functional structure 700 according to various embodiments may be variously implemented in the form of a film, in the form of foam, in the form having a thickness, through a coating technique, through a printing technique, and an etching technique. For example, the functional structure 700 may act as a stacked structure as it is implemented in a multilayered form using at least one technical scheme, for example, by printing, depositing, or etching one or more functional layers.

The one or more functional layers 710, 730, 740, 750, 760, 770, 780, and 790 according to various embodiments may have characteristics, such various strengths, various permittivities, various magnetic permeabilities, or various conductivities for respective layers. Further, the one or more functional layers may include one or more characteristics of strengths, permittivities, magnetic permeabilities, or conductivities that are the same or different for the respective layers.

Because the one or more functional layers having characteristics of various strengths, various permittivities, various magnetic permeabilities, or various conductivities are implemented in a multilayered form, one or more material characteristics, such as strength, permittivity, magnetic permeability, or conductivity can be controlled, and thus the functional structure 320 according to various embodiments can have characteristics of the material that is optimized for a single frequency band or multiple frequency bands.

The cover functional structure according to various embodiments may be located in the window area of the cover frame of the disclosure using a method such as joining, bonding, engagement, fusion, or coupling.

Figure 8:
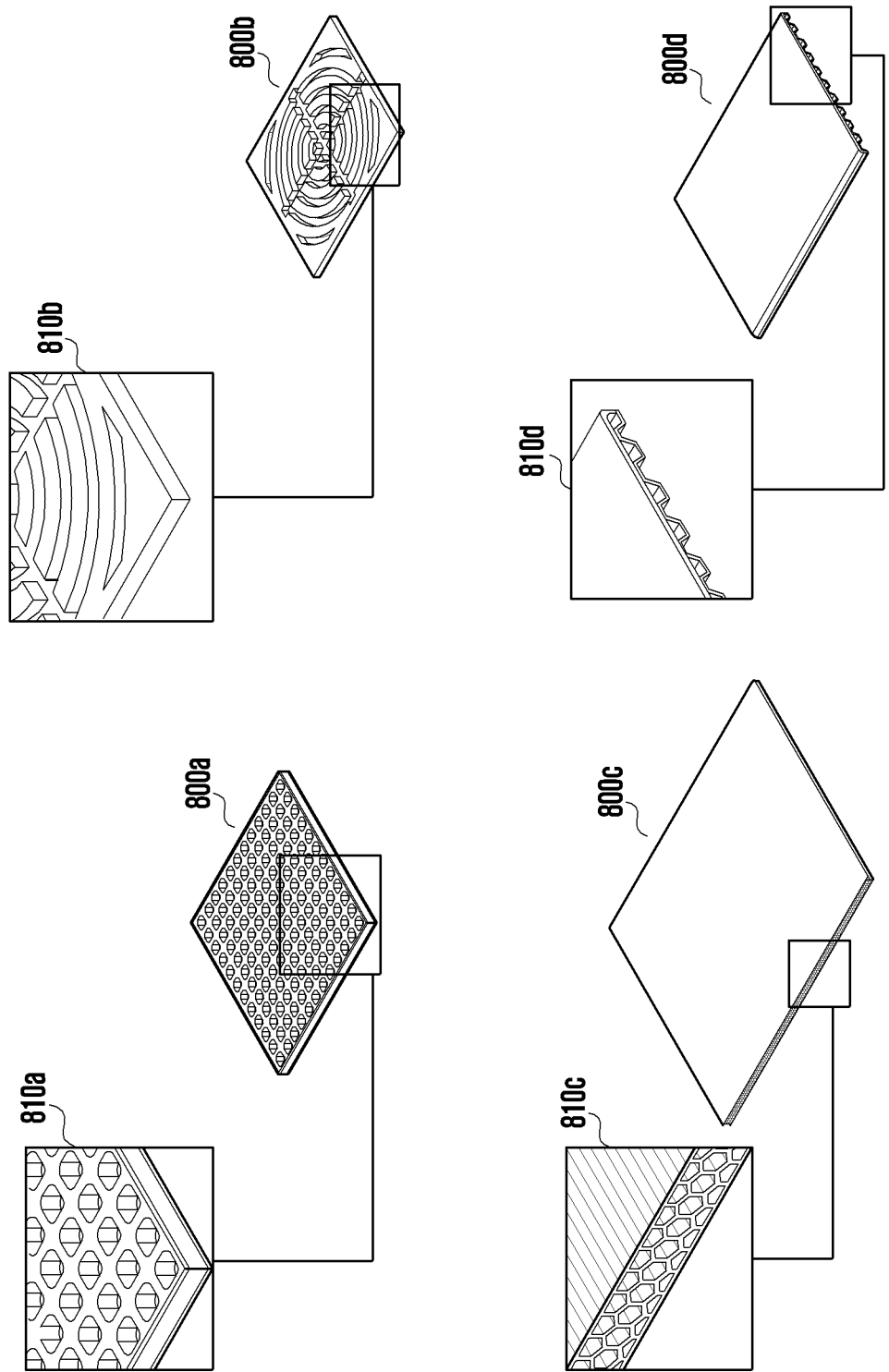
FIG. 8 is a diagram illustrating example internal structures of example functional layers according to various embodiments.

FIG. 8 is a diagram illustrating example internal structures of functional layers according to various embodiments.

The one or more functional layers included in the functional structure according to various embodiments may have a periodic or non-periodic pattern for optimization of the performance of an antenna.

The functional layers included in the functional structure 800*a* according to various embodiments may have a flat plate reinforcing structure having a round edge periodic structure 810*a*, a flat plate reinforcing structure 800*b* having a circular periodic structure 810*b*, a flat plate reinforcing structure 800*c* having a vertical periodic structure 810*c*, and a flat plate reinforcing structure 800*d* having a horizontal periodic structure 810*d*. The above-described periodic structures are merely non-limiting examples, and the disclosure is not limited.

The functional layers included in the functional structure according to various embodiments may be produced according to various material machining technologies. For example, at least one machining technology of extrusion, injection molding, compression molding, extrusion blow molding, blow molding, expansion molding, extrusion lamination, lamination molding, casting, vacuum forming, pressing, rotational molding, or compression may be used.

Figure 9:
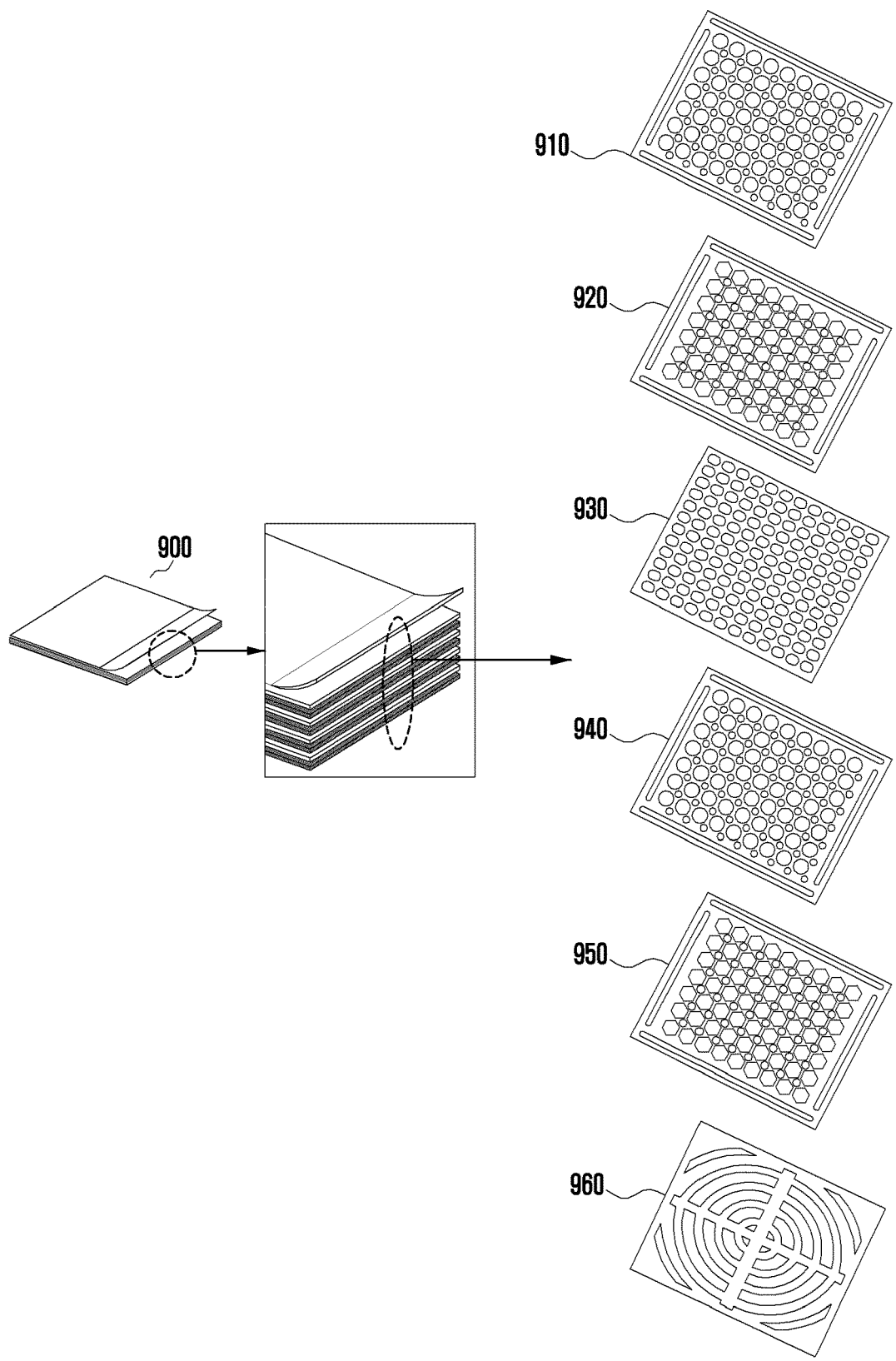
FIG. 9 is a diagram illustrating an example stacked structure of an example functional structure including one or more functional layers according to various embodiments.

FIG. 9 is a diagram illustrating an example stacked structure of an example functional structure including one or more functional layers according to various embodiments.

As illustrated in FIG. 9, the functional structure 900 according to various embodiments may be a stacked structure, in which one or more functional layers 910, 920, 930, 940, 950, and 960 are implemented in a multilayered form.

In addition, the respective layers of the one or more functional layers 910, 920, 930, 940, 950, and 960 may have a periodic or non-periodic pattern for optimization of the performance of an antenna.

For example, the functional layers included in the functional structure according to various embodiments may include at least one of a flat plate reinforcing structure having a round edge periodic structure, a flat plate reinforcing structure having a circular periodic structure, a flat plate reinforcing structure having a vertical periodic structure, and/or a flat plate reinforcing structure having a horizontal periodic structure. The periodic or non-periodic pattern is not limited to the example structures disclosed.

The stack pattern of the functional structure 900 may be a multilayered form may be periodic or non-periodic. For example, as illustrated in FIG. 9, the one or more functional layers 910, 920, 930, 940, 950, and 960 may have a non-periodic stack pattern.

Figure 10:
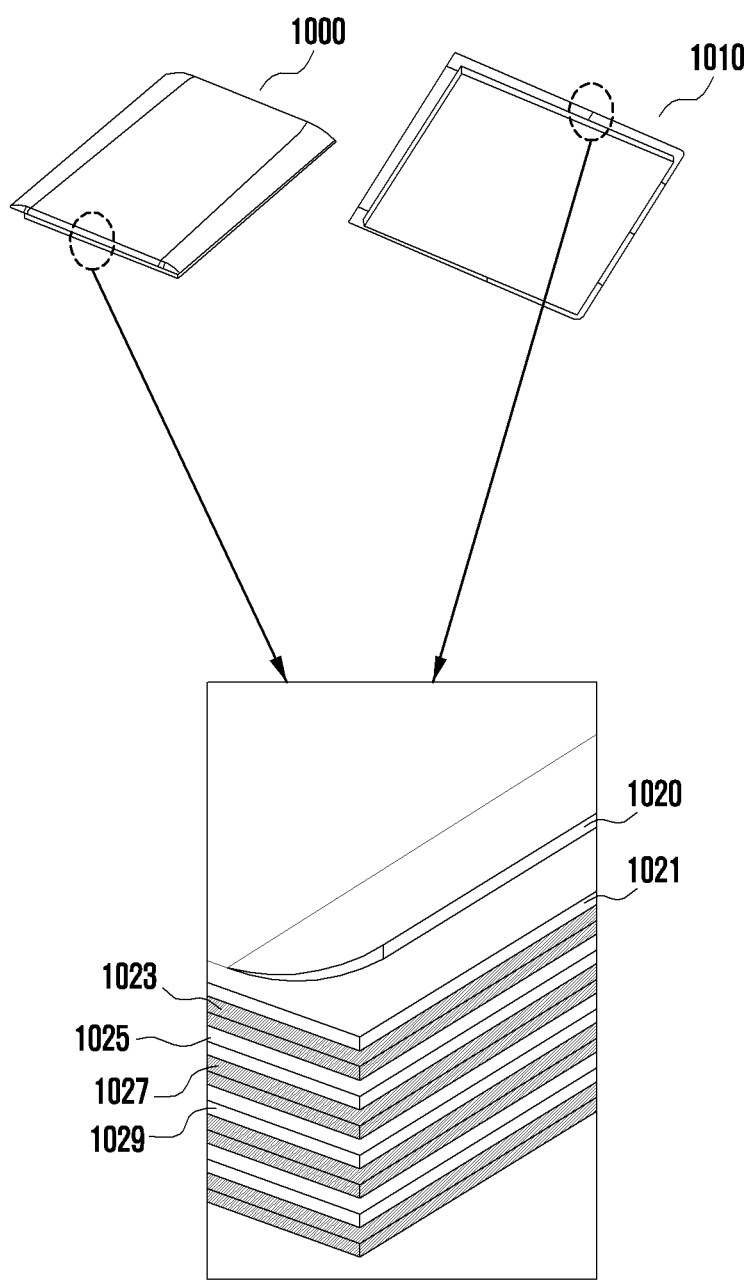
FIG. 10 is a diagram illustrating an example functional structure of an outwardly protruding structure according to various embodiments.

FIG. 10 is a diagram illustrating an example functional structure of an outwardly protruding structure according to various embodiments.

As illustrated in FIG. 10, the functional structure may have an outwardly protruding structure, an upper end 1000 and a lower end 1010 of which are different.

As illustrated in FIG. 10, the interior of the functional structure having the outwardly protruding structure, as illustrated in FIGS. 7, 8 and 9, may have a stacked structure, in which one or more functional layers 1020, 1021, 1023, 1025, 1027, and 1029 are implemented in a multilayered form.

Figure 11:
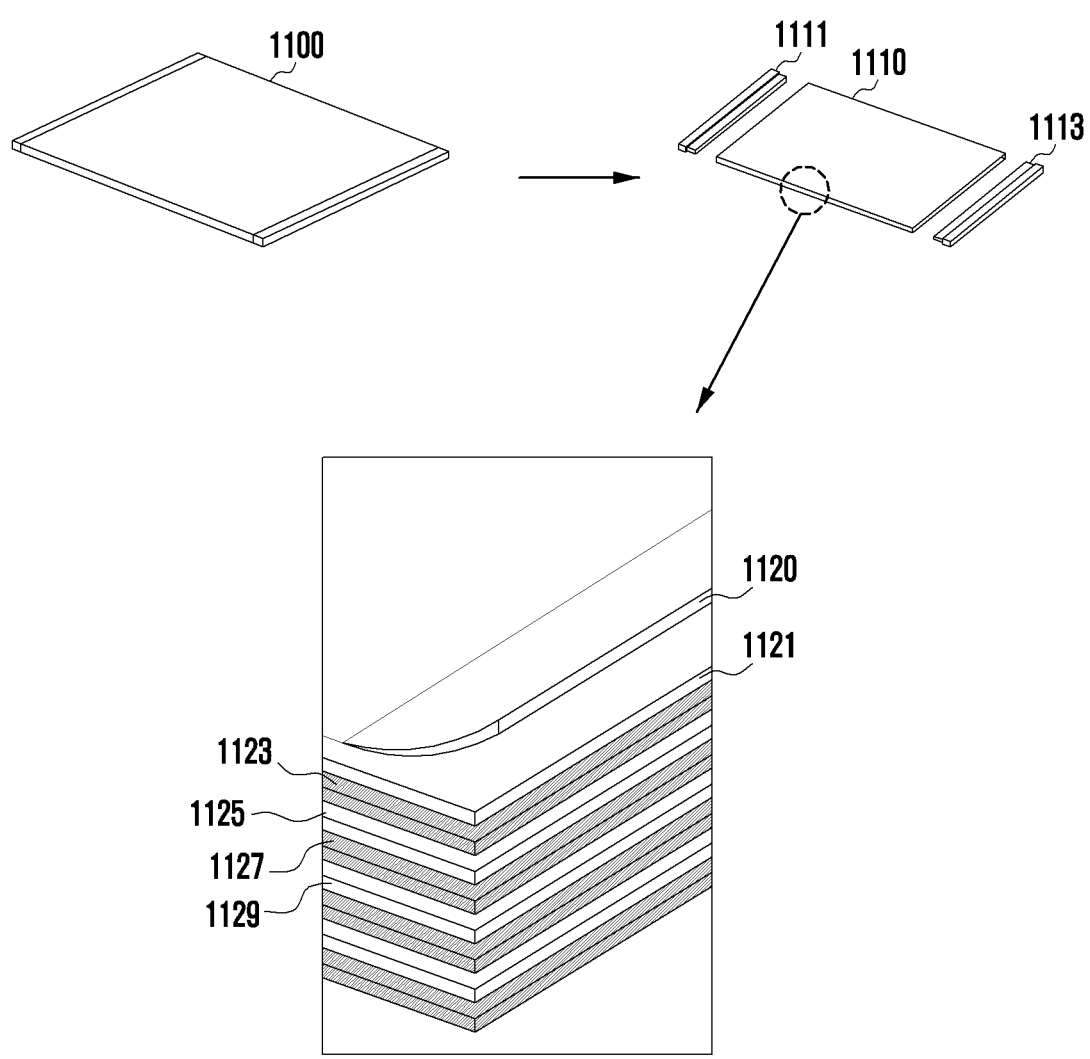
FIG. 11 is a diagram illustrating an example functional structure of an assembled panel structure according to various embodiments.

FIG. 11 is a diagram illustrating an example functional structure of an example assembled panel structure according to various embodiments.

As illustrated in FIG. 11, a functional structure 1100 may have an assembled panel structure including a panel 1110, and a coupling member 1111 and 1113 coupled to an opened side surface part of the panel.

As illustrated in FIG. 11, the interior of the functional structure having the assembled panel structure, as illustrated in FIGS. 7, 8 and 9, also may have a stacked structure, in which one or more functional layers 1120, 1121, 1123, 1125, 1127, and 1129 are implemented in a multilayered form.

Figure 12:
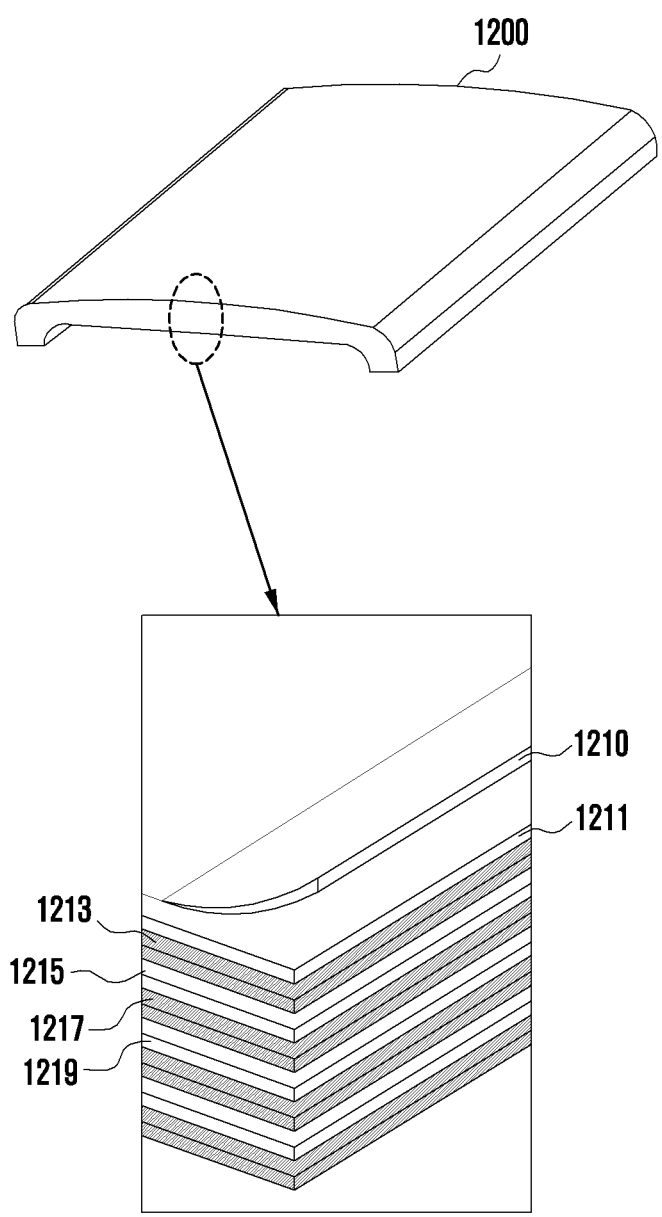
FIG. 12 is a diagram illustrating an example functional structure of a panel structure including a side surface according to various embodiments.

FIG. 12 is a diagram illustrating an example functional structure of a panel structure including a side surface according to various embodiments.

As illustrated in FIG. 12, the functional structure 1200 may have a panel structure including a side surface part.

As illustrated in FIG. 12, the interior of the functional structure having the panel structure, as illustrated in FIGS. 7, 8 and 9, also may have a stacked structure, in which one or more functional layers 1210, 1211, 1213, 1215, 1217, and 1219 are implemented in a multilayered form.

Figure 13A:
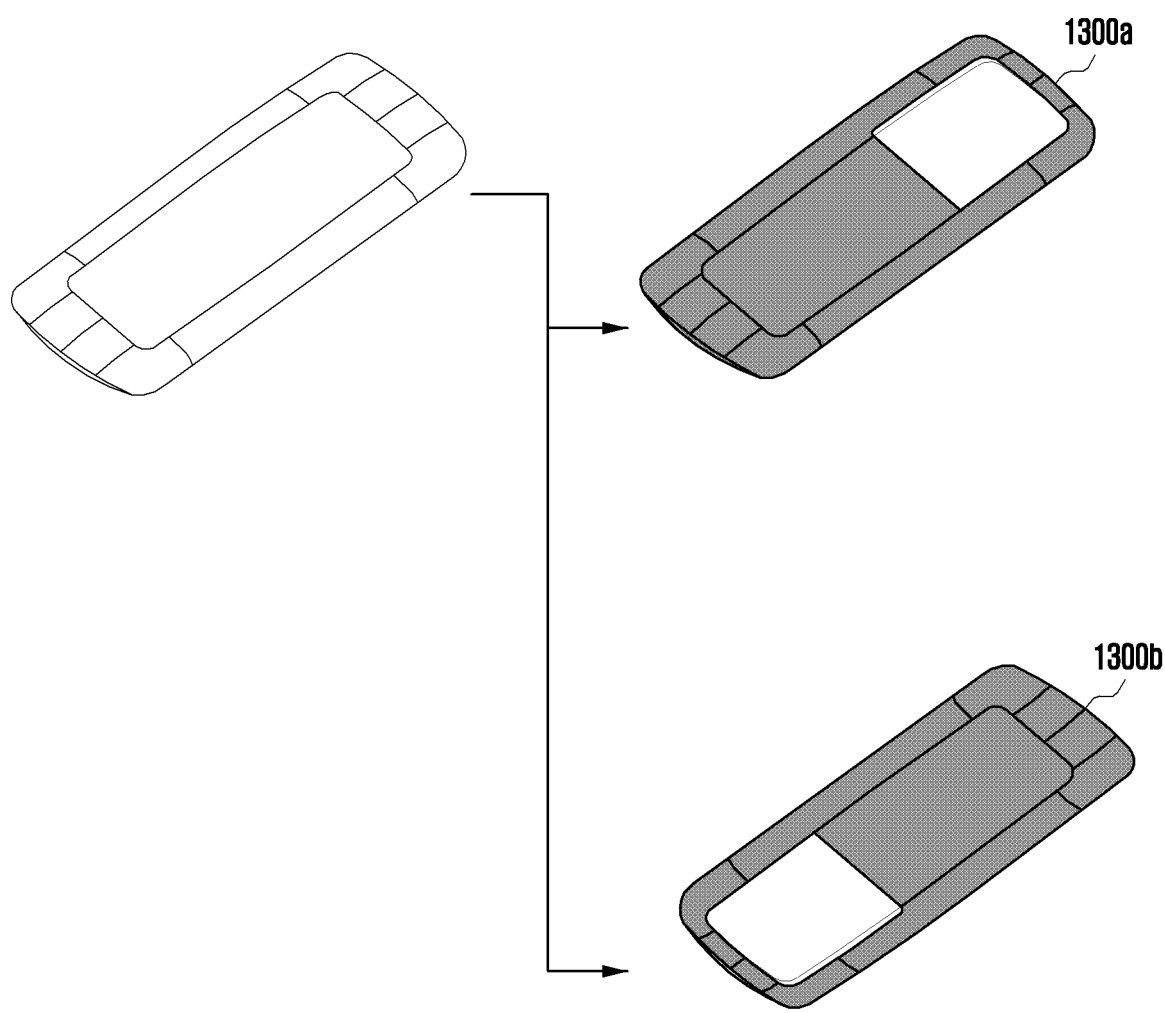
FIG. 13A is a diagram illustrating examples in which a functional structure is located in a partial window area (a first window area) in a cover frame according to various embodiments.
Figure 13B:
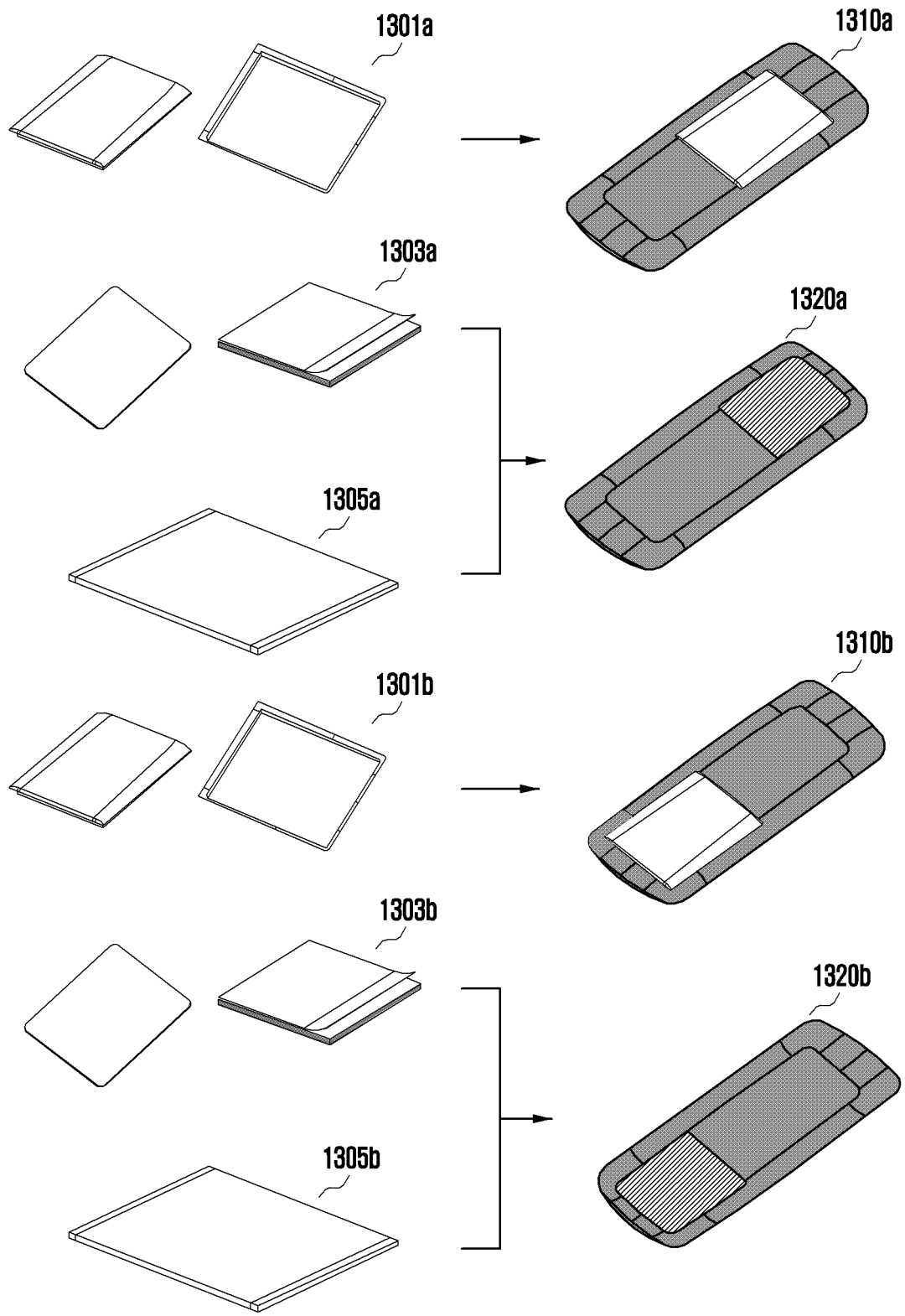
FIG. 13B is a diagram illustrating examples in which a functional structure is located in a partial window area (a first window area) in a cover frame according to various embodiments.

FIG. 13A is a diagram illustrating various examples, in which a functional structure is located in a partial window area (a first window area) in a cover frame according to various embodiments, and FIG. 13B is a diagram illustrating various examples, in which a functional structure is located in a partial window area (a first window area) in a cover frame according to various embodiments.

As illustrated in FIG. 13A, the cover frame may be implemented by a cover frame 1300a for an upper end antenna, in which a window area is opened at an upper end thereof, and a cover frame 1300b for a lower end antenna, in which a window area is opened at a lower end thereof, according to an area, in which a window is implemented.

Cover devices of various forms may be implemented by locating various functional structures illustrated in FIG. 13B in an opened window area of the cover frame illustrated in FIG. 13A.

The functional structure according to various embodiments may be located in the window area of the cover frame of the disclosure using a method such as joining, bonding, engagement, fusion, or coupling.

For example, a cover device 1310a for an upper antenna, an outside of which protrudes, may be finished by locating the functional structure 1301a having the outwardly protruding structure illustrated in FIG. 13B in the window area of the cover frame 1300a for the upper end antenna illustrated in FIG. 13A.

Further, a device 1320a for an upper antenna, an outside of which does not protrude, may be finished by locating the functional structure 1303a having the stacked structure illustrated in FIG. 13B or the functional structure 1305a having the assembled panel structure in the window area of the cover frame 1300a for the upper end antenna illustrated in FIG. 13A.

A cover device 1310b for a lower antenna, an outside of which protrudes, may be finished by locating the functional structure 1301b having the outwardly protruding structure illustrated in FIG. 13B in the window area of the cover frame 1300b for the lower end antenna illustrated in FIG. 13A.

In addition, a cover device 1320b for a lower antenna, an outside of which does not protrude, may be finished by locating the functional structure 1303b having the stacked structure illustrated in FIG. 13B or the functional structure 1305b having the assembled panel structure in the window area of the cover frame 1300b for the lower end antenna illustrated in FIG. 13A.

Figure 14A:
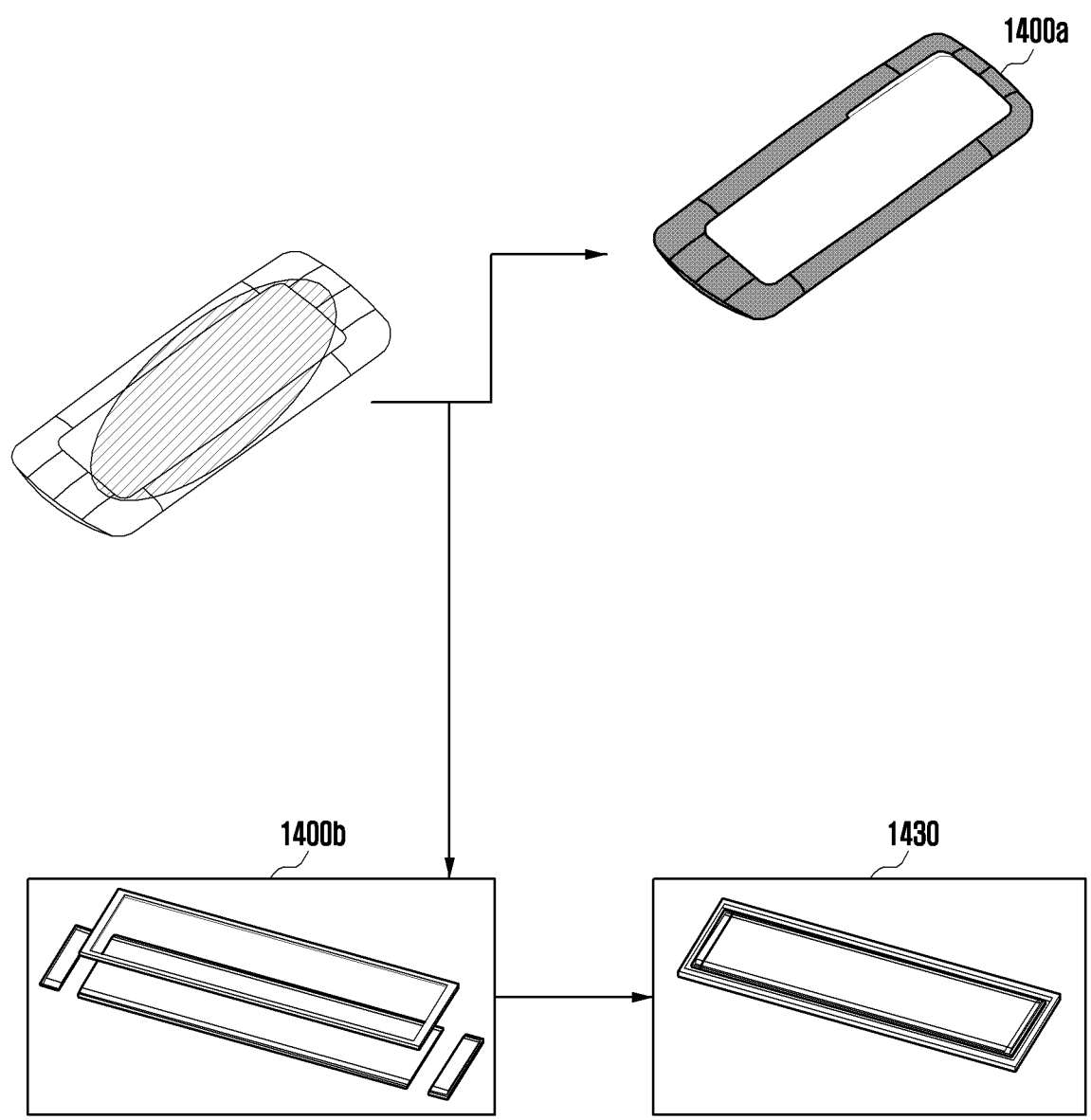
FIG. 14A is a diagram illustrating examples in which a functional structure is located in a front window area (a second window area) in the cover frame according to various embodiments.
Figure 14B:
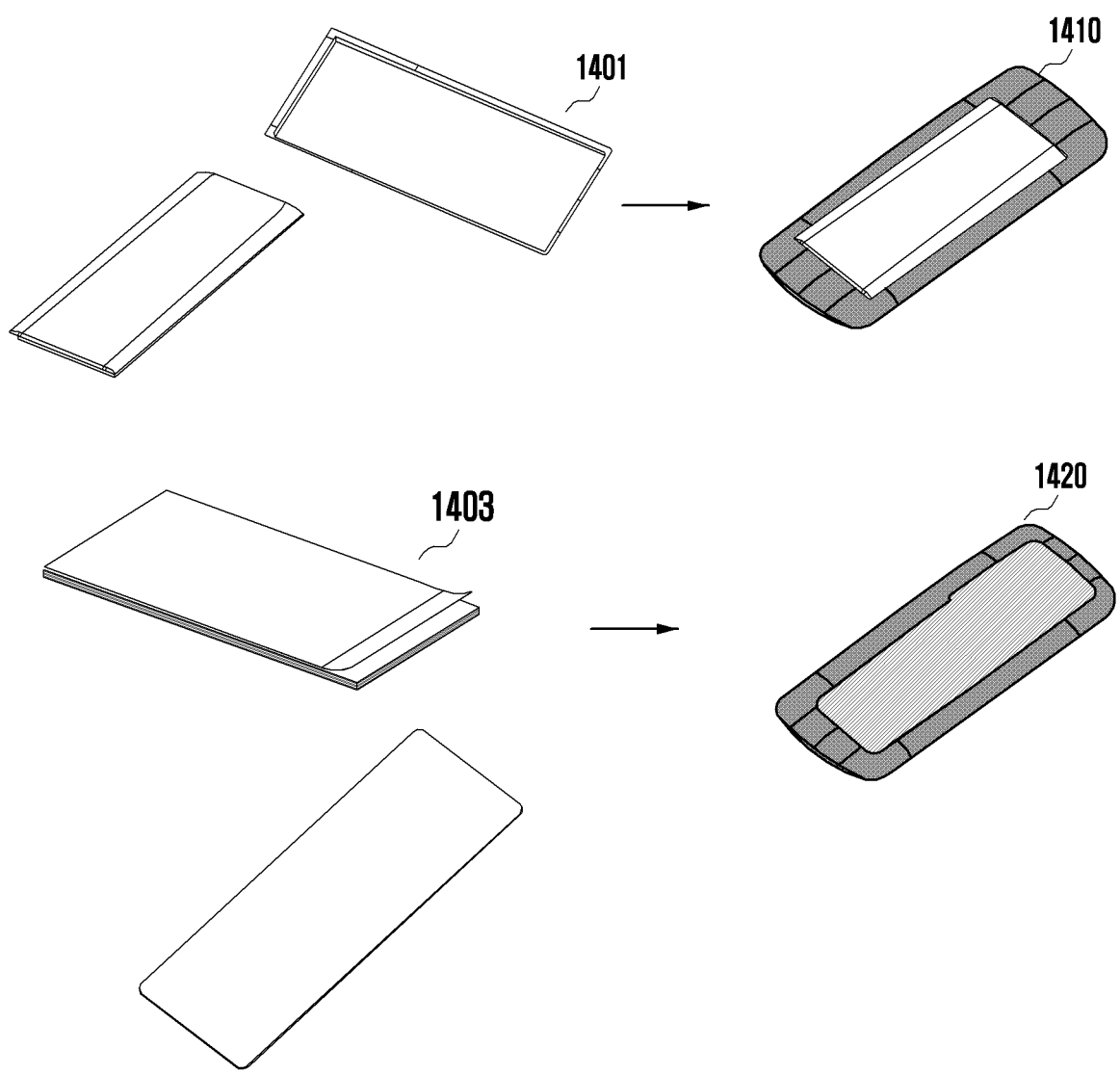
FIG. 14B is a diagram illustrating examples in which a functional structure is located in a front window area (a second window area) in the cover frame according to various embodiments.

FIG. 14A is a diagram illustrating various examples, in which a functional structure is located in a front window area (a second window area) in the cover frame according to various embodiments, and FIG. 14B is a diagram illustrating various examples, in which a functional structure is located in a front window area (a second window area) in the cover frame according to various embodiments.

As illustrated in FIG. 14A, the cover frame may be implemented by a cover frame 1400a for a front surface antenna and an assembled cover frame 1400b for a front surface antenna, in which a window area is opened on a front surface thereof, according to an area, in which a window is implemented.

The assembled cover frame 1400b for a front surface antenna illustrated in FIG. 14A may directly act as a cover device 1430 for a front surface antenna using an assembly concept.

Cover devices of various forms may be implemented by locating various functional structures illustrated in FIG. 14B in an opened window area of the cover frame 1400a for a front surface antenna illustrated in FIG. 14A.

The cover functional structure according to various embodiments may be located in the window area of the cover frame of the disclosure using a method such as joining, bonding, engagement, fusion, or coupling.

For example, a cover device 1410 for a front surface antenna, an outside of which protrudes, may be finished by locating the functional structure 1401 having the outwardly protruding structure illustrated in FIG. 14B in the window area of the cover frame 1400a for the front surface antenna illustrated in FIG. 14A.

Further, a cover device 1420 for a front surface antenna, an outside of which does not protrude, may be finished by locating the functional structure 1403 having the stacked structure illustrated in FIG. 14B in the window area of the cover frame 1400a for the front surface antenna illustrated in FIG. 14A.

Figure 15:
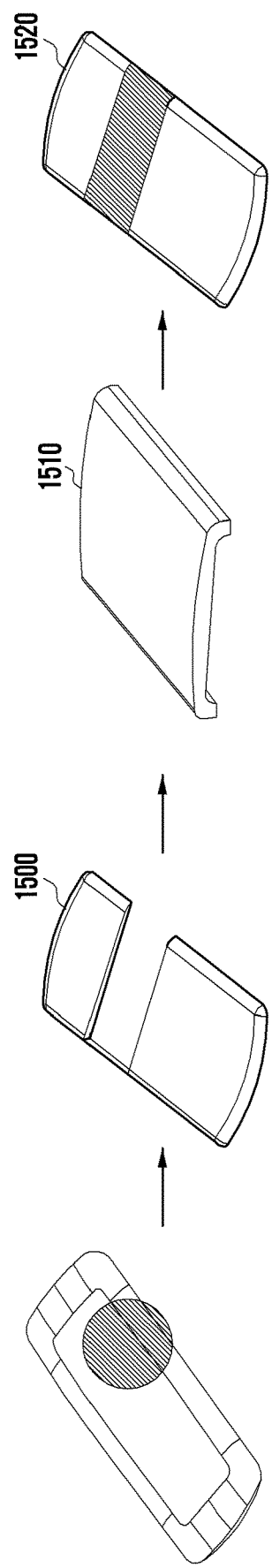
FIG. 15 is a diagram illustrating an example, in which a functional structure is located in a side window area (a third window area) in the cover frame according to various embodiments.

FIG. 15 is a diagram illustrating an example, in which a functional structure is located in a side window area (a third window area) in the cover frame according to various embodiments.

When an antenna device is embedded on a side surface part of a base station device as illustrated in FIG. 15, an opened window area may be located on a side surface of a cover frame 1500 for a side surface antenna.

A cover device 1520 for a side surface antenna may be finished by coupling a cover functional structure 1510 having a side surface part included panel structure illustrated in FIG. 15 to a window area 100 for a side surface antenna illustrated in FIG. 15 through side sliding.

Figure 16:
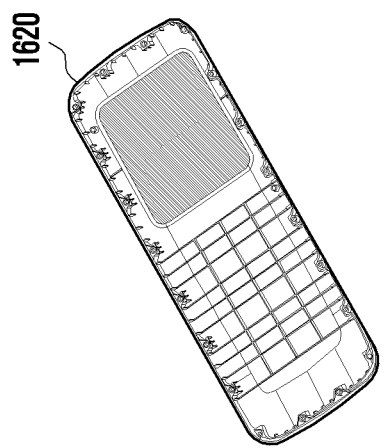
FIG. 16 is a diagram illustrating an example in which a functional structure is located in a cover frame according to various embodiments.
Figure 16:
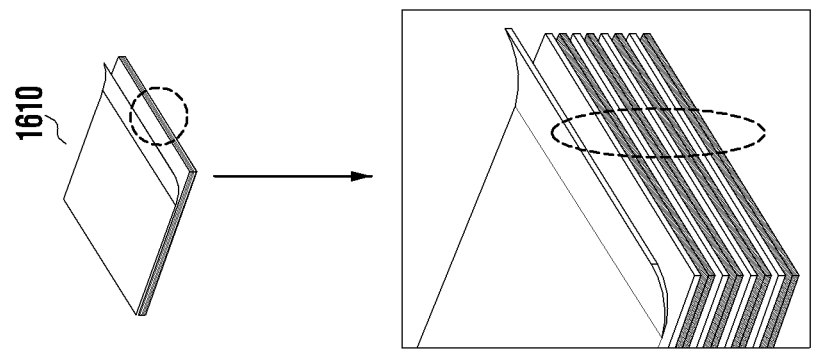
Figure 16:
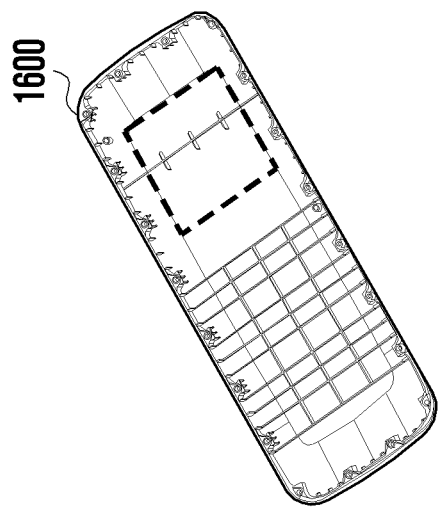

FIG. 16 is a diagram illustrating an example in which a functional structure is located in a cover frame according to various embodiments.

As illustrated in FIG. 16, a cover frame 1600 according to an embodiment may have a predetermined thickness d.

The cover frame 1600 according to the second embodiment illustrated in FIG. 16 may be a cover frame 1600 for an upper end antenna used when an antenna device is embedded at an upper end of a base station device.

As illustrated in FIG. 16, a functional structure 1610 of a stacked structure including one or more functional layers may be added to the cover frame 1600 having the predetermined thickness d according to an embodiment, whereby a cover device 1620 having characteristics of a material that is optimized for a single frequency band or multiple frequency bands.

The thickness d may be a thickness of a cover that is optimized for respective frequency bands, and may be changed according to implementation of the cover. For example, the thickness d of the cover frame 1600 according to the second embodiment may be the smallest thickness corresponding to the highest frequency band that is supported by a 5G system.

Figure 17:
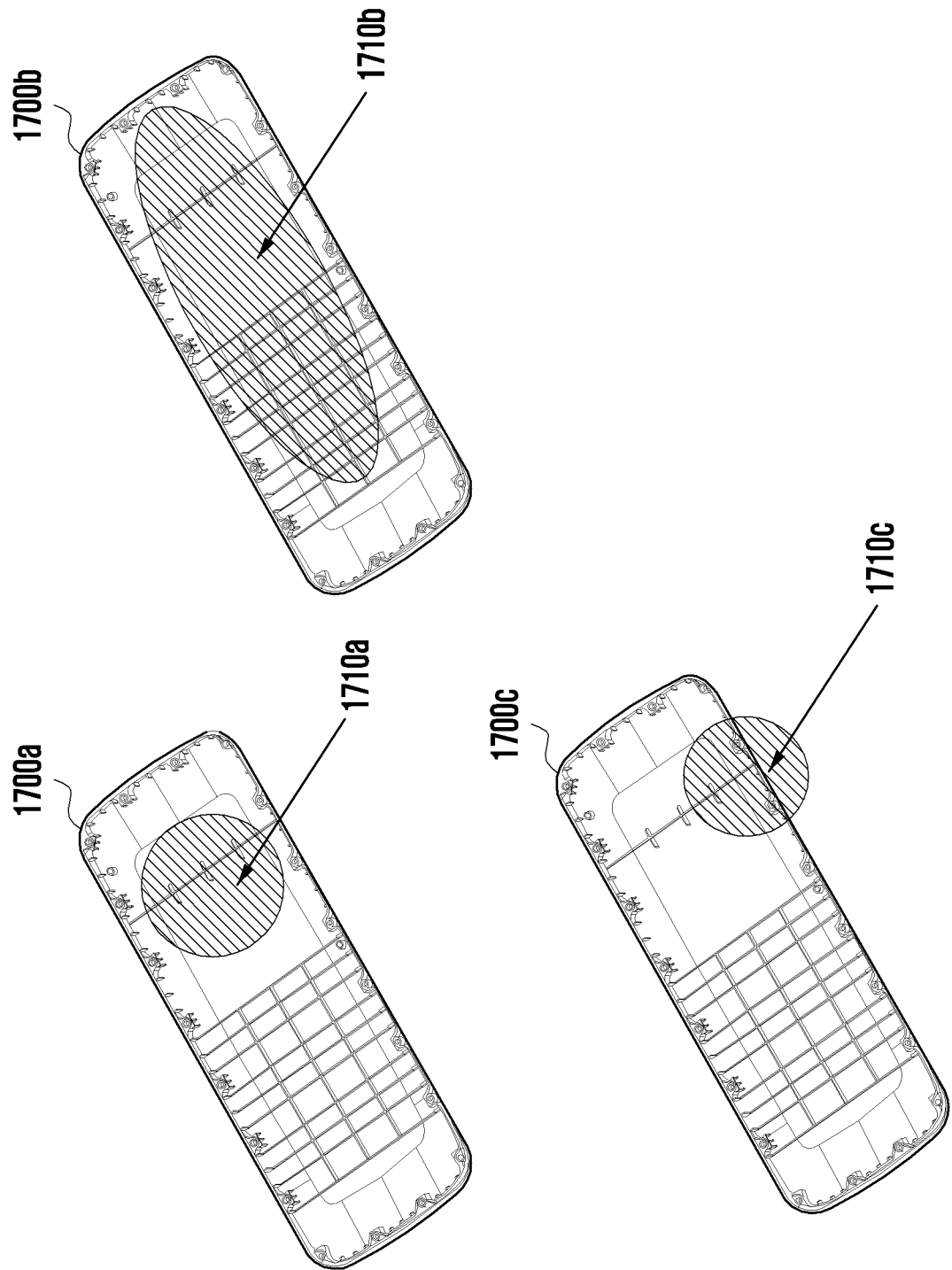
FIG. 17 is a diagram illustrating various example cover frames according to various embodiments.

FIG. 17 is a diagram illustrating various example cover frames according to various embodiments.

As illustrated in FIG. 17, cover frames of various structures having a predetermined thickness d according to the location and the size of an antenna device embedded in a base station device are provided.

The area, in which the thickness of the cover frame is the thickness d, according to an embodiment corresponds to a radiation area of the antenna in the base station device, and may be changed according to the location and the extent of the antenna device embedded in the base station device.

For example, as illustrated in FIG. 17, when an antenna device is embedded at an upper end of the base station device, the thickness of an upper end area 1710a of the cover frame 1700a for an upper end antenna may be the thickness d.

In addition, when the antenna device is embedded on the front surface of the base station device, the thickness of a front surface area 1710b of the cover frame 1700b for a front surface antenna may be the thickness d, and when the antenna device is embedded on a side surface of the base station device, the thickness of a side surface area 1710c of the cover frame 1700c for a side surface antenna may be the thickness d.

Figure 18A:
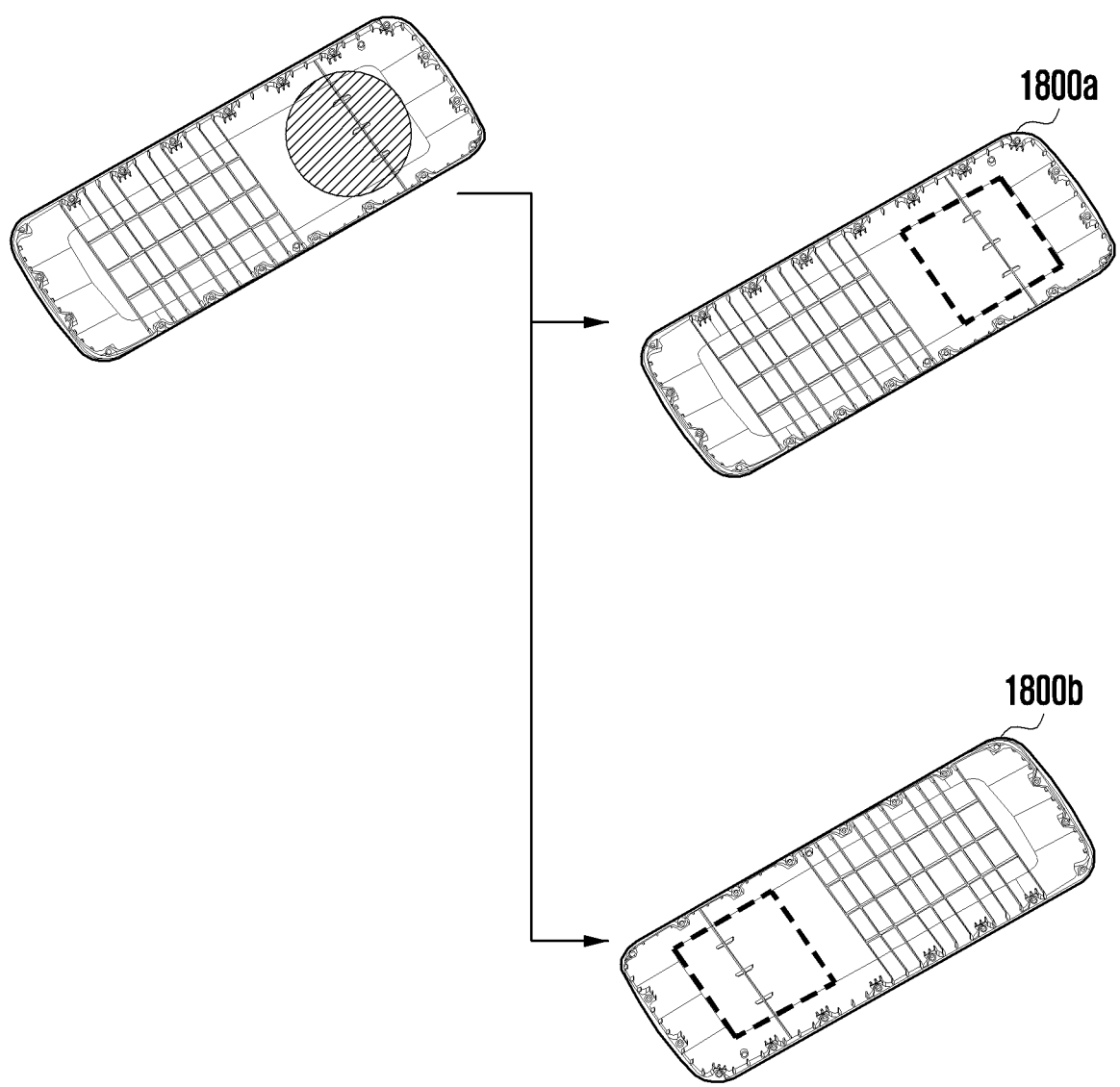
FIG. 18A is a diagram illustrating examples in which a functional structure is located in a partial area (a first area) in the cover frame according to various embodiments.
Figure 18B:
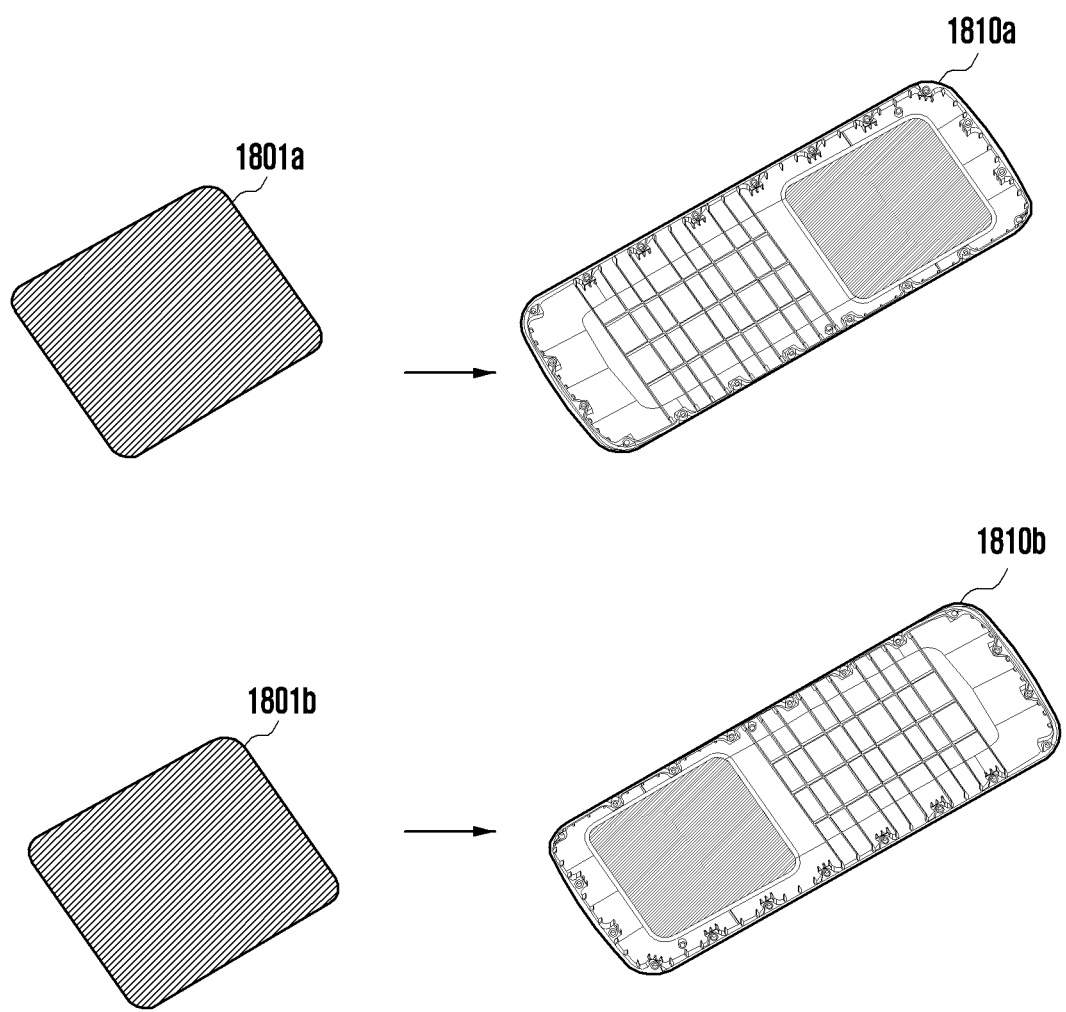
FIG. 18B is a diagram illustrating examples in which a functional structure is located in a partial area (a first area) in the cover frame according to various embodiments.

FIG. 18A is a diagram illustrating various examples in which a functional structure is located in a partial area (a first area) in the cover frame according to various embodiments, and FIG. 18B is a diagram illustrating various examples in which a functional structure is located in a partial area (a first area) in the cover frame according to various embodiments.

As illustrated in FIG. 18A, when an antenna device is embedded at an upper end of a base station device, the thickness of an upper end area of a cover frame 1800a for an upper end antenna may be the thickness d, and when the antenna device is embedded at a lower end of the base station device, the thickness of a lower end area of a cover frame 1800b for a lower end antenna may be the thickness d.

The thickness d may be a thickness of a cover that is optimized for respective frequency bands, and may be changed according to implementation of the cover. For example, the thickness d may be the smallest thickness corresponding to the highest frequency band that is supported by a 5G system.

As illustrated in FIG. 18B, the functional structures 1801a and 1801b of a stacked structure including one or more functional layers may be added to an upper end area of the cover frame 1800a for an upper end antenna or a lower end area of the cover frame 1800b for a lower end antenna, whereby a cover device 1810a for an upper end antenna or a cover device 1810b for a lower end antenna, in which an upper end area or a lower end area corresponding to a radiation area of an antenna has a material that is optimized for a single frequency band or multiple frequency bands, may be finished.

Figure 19:
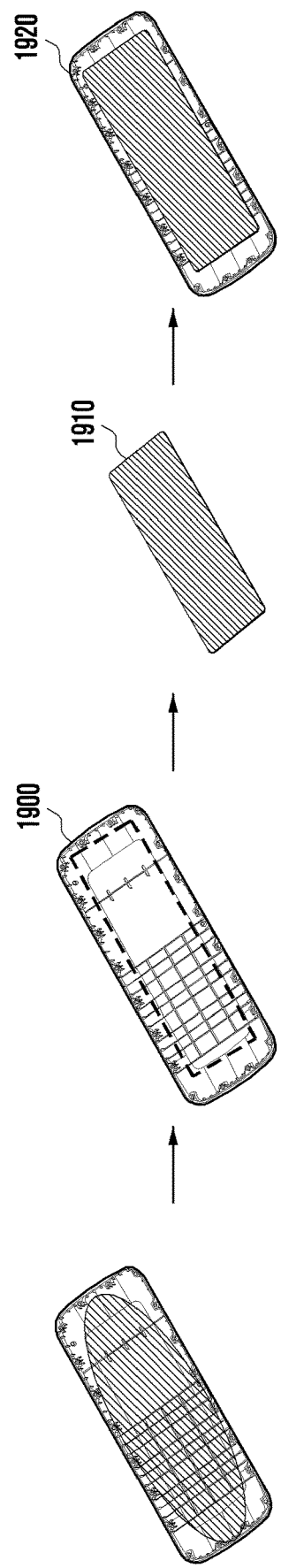
FIG. 19 is a diagram illustrating an example in which a functional structure is located in a front surface area (a second area) in the cover frame according to various embodiments.

FIG. 19 is a diagram illustrating an example in which a functional structure is located in a front surface area (a second area) in the cover frame according to various embodiments.

As illustrated in FIG. 19, when an antenna device is embedded on a front surface of a base station device, the thickness of a front surface area of a cover frame 1900 for a front surface antenna may be the thickness d.

The thickness d may be a thickness of a cover that is optimized for respective frequency bands, and may be changed according to implementation of the cover. For example, the thickness d may be the smallest thickness corresponding to the highest frequency band that is supported by a 5G system.

As illustrated in FIG. 19, a functional structure 1910 of a stacked structure including one or more functional layers may be added to a front surface area of a cover frame 1900 for a front surface antenna, whereby a cover device 1920 for a front surface antenna, in which a front surface area corresponding to a radiation area of an antenna has a material that is optimized for a single frequency band or multiple frequency bands may be finished.

Figure 20:
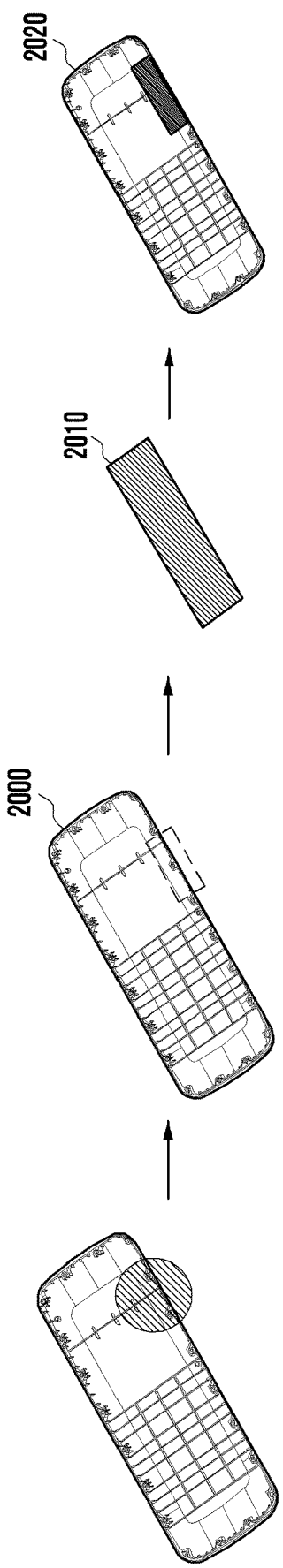
FIG. 20 is a diagram illustrating an example in which a functional structure is located in a side surface area (a third area) in the cover frame according to various embodiments.

FIG. 20 is a diagram illustrating an example in which a functional structure is located in a side surface area (a third area) in the cover frame according to various embodiments.

As illustrated in FIG. 20, when an antenna device is embedded on a side surface of a base station device, the thickness of a side surface area of a cover frame 2000 for a side surface antenna may be the thickness d.

The thickness d may be a thickness of a cover that is optimized for respective frequency bands, and may be changed according to implementation of the cover. For example, the thickness d may be the smallest thickness corresponding to the highest frequency band that is supported by a 5G system.

As illustrated in FIG. 20, a functional structure 2010 of a stacked structure including one or more functional layers may be added to a side surface area of a cover frame 2000 for a side surface antenna, whereby a cover device 2020 for a side surface antenna, in which a side surface area corresponding to a radiation area of an antenna has a material that is optimized for a single frequency band or multiple frequency bands may be finished.

FIG. 21A is a graphical diagram illustrating an example simulation result of antenna gains measured at different frequency bands when a cover device including a functional structure is used according to various embodiments, and FIG. 21B is a graphical diagram illustrating an example simulation result of antenna gains measured at different frequency bands when a cover device including a functional structure is used according to various embodiments.

The X axis of the graphs illustrated in FIGS. 21A and 21B may refer to the angle of a beam having a coverage of 180 degrees, and the Y axis may refer to the gain of an antenna, which represents received power of a terminal as compared with transmitted power of a base station. In addition, the graphs of the drawings depict results according to various indexes of a tilt beam together.

FIG. 21A illustrates the gain of an antenna measured when a cover device including a functional structure according to various embodiments is used in the case in which the frequency band of a beam radiated from an antenna device embedded in a base station device is 28 GHz.

FIG. 21B illustrates the gain of an antenna measured when a cover device including a functional structure according to various embodiments is used in the case in which the frequency band of a beam radiated from an antenna device embedded in a base station device is 39 GHz.

When the cover device including a functional structure according to various embodiments is used, it can be seen that the gain of an antenna on the right side of the Y axis is uniform when the frequency band of the beam is 28 GHz as illustrated in FIG. 21A, and it can be seen that the gain of an antenna on the left side of the Y axis is uniform when the frequency band of the beam is 39 GHz as illustrated in FIG. 21B.

Accordingly, the cover device including the functional structure according to various example embodiments can minimize and/or reduce distortion of a beam radiated from the antenna device embedded in the base station device as illustrated in FIGS. 21A and 21B even when the frequency band of the beam is 28 GHz or 39 GHz.

Accordingly, in the cover device according to various example embodiments, by locating the functional structure having characteristics of various materials in one cover frame, a cover device that is optimized for a single frequency band or multiple frequency bands may be implemented by one device or shared when the base station having the same external shape is implemented.

According to various example embodiments, because the cover device can be implemented by one device or shared as a cover device that is optimized for a single frequency band or multiple frequency bands, distortion of beams of multiple bands can be minimized and/or reduced when a multiple band integrated antenna is implemented, and thus deterioration of the performance of an antenna can be minimized.

In the above-described detailed embodiments of the disclosure, an element included in the disclosure may be expressed in the singular or the plural according to presented example embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

An example embodiment of the disclosure relates to a cover device configured to protect an antenna device embedded in an electronic device to radiate a beam of an ultra-high frequency band, the cover device comprising: a cover frame comprising a window area corresponding to a radiation area of the antenna device; and a functional structure located in the window area on the cover frame, the functional structure including a stacked structure comprising one or more functional layers.

wherein the window area may be located at least one of an upper end portion, a lower end portion, a front surface portion, or a side surface portion of the cover frame.

wherein the one or more functional layers of the functional structure may be arranged in a multilayered form and configured to control at least one of strength, permittivity, magnetic permeability, or conductivity.

wherein the one or more functional layers may comprise one or more characteristics of strengths, permittivities, magnetic permeabilities, or conductivities that are the same or different for respective layers.

wherein the one or more functional layers may comprise at least one of a thermoplastic material, a thermosetting material, or an inorganic material.

wherein the one or more functional layers of the stacked structure may be provided by at least one of printing, deposition, or etching.

wherein the one or more functional layers may have a periodic or non-periodic pattern.

wherein the functional layers having the periodic pattern may include a flat plate reinforcing structure having at least one of a round edge periodic structure, a circular periodic structure, a vertical periodic structure, or a horizontal periodic structure.

wherein the one or more functional layers may be provided by at least one of extrusion, injection molding, compression molding, extrusion blow molding, blow molding, expansion molding, extrusion lamination, lamination molding, casting, vacuum forming, pressing, rotational molding, and compression.

wherein the functional structure may be disposed in the window area of the cover frame by at least one of joining, bonding, engagement, fusion, or coupling.

Another example embodiment of the disclosure relates to a cover device configured to protect an antenna device embedded in an electronic device to radiate a beam of an ultra-high frequency band, the cover device comprising: a cover frame corresponding to a radiation area of the antenna device and comprising a first area having a predetermined thickness; and a functional structure disposed in the first area on the cover frame, the functional structure including a stacked structure comprising one or more functional layers.

wherein the first area may be located at least one of an upper end portion, a lower end portion, a front surface portion, or a side surface portion of the cover frame.

wherein the one or more layers of the functional structure may be arranged in a multilayered form and configured to control at least one of strength, permittivity, magnetic permeability, or conductivity.

wherein the one or more functional layers may comprise one or more characteristics of strengths, permittivities, magnetic permeabilities, or conductivities that are the same or different for respective layers.

wherein the one or more functional layers may comprise at least one of a thermoplastic material, a thermosetting material, or an inorganic material.

wherein the one or more functional layers may have the stacked structure provided by at least one of printing, deposition, or etching.

wherein the one or more functional layers may have a periodic or non-periodic pattern.

wherein the functional layers having the periodic pattern may include a flat plate reinforcing structure having at least one of a round edge periodic structure, a circular periodic structure, a vertical periodic structure, or a horizontal periodic structure.

wherein the one or more functional layers may be provided using at least one of extrusion, injection molding, compression molding, extrusion blow molding, blow molding, expansion molding, extrusion lamination, lamination molding, casting, vacuum forming, pressing, rotational molding, and compression.

wherein the functional structure may be disposed in the first area of the cover frame by at least one of joining, bonding, engagement, fusion, or coupling.

Although various example embodiments have been described in the detailed description of the disclosure, various modifications and changes may be made thereto without departing from the scope of the disclosure. Therefore, the scope of the disclosure should not be defined as being limited to the embodiments.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly or via another element (e.g., third element).

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents.

What is claimed is:

1. A base station device for communicating with a terminal, the base station comprising:
   an antenna device including a plurality of antennas to radiate a signal on a frequency band;
   a cover frame comprising an opened window area; and
   a functional structure disposed in the opened window area of the cover frame and disposed above a radiation area on which the plurality of antennas is disposed,
   wherein the functional structure comprises functional layers including at least one material associated with the frequency band, and
   wherein the functional layers are configured to control an antenna gain of the signal on the frequency band based on a permittivity and a dielectric loss of the at least one material.

2. The base station device of claim 1,
   wherein the opened window area is located at a portion corresponding to the radiation area in the cover frame, and
   wherein the portion of the cover frame comprises at least one of an upper end portion, a lower end portion, a front surface portion, or a side surface portion of the cover frame.

3. The base station device of claim 1, wherein the functional layers of the functional structure are arranged in a multilayered form and configured to control at least one of strength, permittivity, magnetic permeability, or conductivity to reduce a distortion of the signal on with the frequency band.

4. The base station device of claim 1,
   wherein the at least one material comprises at least one of a thermoplastic material, a thermosetting material, or an inorganic material, and
   wherein each functional layer of the functional layers is provided by at least one of printing, deposition, or etching.

5. The base station device of claim 1, wherein each functional layer of the functional layers have one of patterns, and
   wherein the periodic patterns comprise at least one of a round edge periodic structure, a circular periodic structure, a vertical periodic structure, or a horizontal periodic structure.

6. The base station device of claim 1, wherein the functional layers are provided by at least one of extrusion, injection molding, compression molding, extrusion blow molding, blow molding, expansion molding, extrusion lamination, lamination molding, casting, vacuum forming, pressing, rotational molding, and compression.

7. The base station device of claim 1, wherein the functional structure is disposed in the opened window area of the cover frame by at least one of joining, bonding, engagement, fusion, or coupling.

8. The base station device of the claim 1, wherein the functional layers include a first functional layer with a first permittivity and a second functional layer with a second permittivity which is different from the first permittivity.

9. The base station device of the claim 1, wherein the frequency band comprises a frequency band including 28 gigahertz (GHz) or a frequency band including 39 GHz.

10. The base station device of claim 1,
    wherein the antenna device further includes a plurality of second antennas to radiate a signal on a second frequency band which is different from the frequency band,
    wherein the base station device further comprises a second functional structure disposed between the opened window area of the cover frame and a second radiation area on which the plurality of second antennas is disposed,
    wherein the functional structure comprises second functional layers having at least one material associated with the second frequency band, and
    wherein the at least one material associated with the second frequency band is different from the at least one material associated with the frequency band.

11. A base station device for communicating with a terminal, the base station comprising:
    an antenna device including a plurality of antennas to radiate a signal on a frequency band;
    a cover frame comprising a first area having a predetermined thickness; and
    a functional structure disposed in the first area on the cover frame and disposed above a radiation area in which the plurality of antennas is disposed,
    wherein the functional structure comprises functional layers having at least one material associated with the frequency band, and
    wherein the functional layers are configured to control an antenna gain of the signal on the frequency band based on a permittivity and a dielectric loss of the at least one material.

12. The base station device of claim 11,
    wherein the first area is located at a portion corresponding to the radiation area in the cover frame, and
    wherein the portion of the cover frame comprises at least one of an upper end portion, a lower end portion, a front surface portion, or a side surface portion of the cover frame.

13. The base station device of claim 11, wherein the functional layers of the functional structure are arranged in a multilayered form and configured to control at least one of strength, permittivity, magnetic permeability, or conductivity to reduce a distortion of the signal on with the frequency band.

14. The base station device of claim 11,
wherein the at least one material comprises at least one of a thermoplastic material, a thermosetting material, or an inorganic material, and
wherein each functional layer of the functional layers is provided by at least one of printing, deposition, or etching.

15. The base station device of claim 11, wherein each functional layer of the functional layers have one of periodic patterns, and
wherein the periodic patterns comprise at least one of a round edge periodic structure, a circular periodic structure, a vertical periodic structure, or a horizontal periodic structure.

16. The base station device of claim 11, wherein the functional layers are provided using at least one of extrusion, injection molding, compression molding, extrusion blow molding, blow molding, expansion molding, extrusion lamination, lamination molding, casting, vacuum forming, pressing, rotational molding, and compression.

17. The base station device of claim 11, wherein the functional structure is disposed in the first area of the cover frame by at least one of joining, bonding, engagement, fusion, or coupling.

18. The base station device of the claim 11, wherein the functional layers include a first functional layer with a first permittivity and a second functional layer with a second permittivity which is different from the first permittivity.

19. The base station device of the claim 11,
wherein the frequency band comprises a frequency band including 28 gigahertz (GHz) or a frequency band including 39 GHz, and
wherein the predetermined thickness is associated with a frequency band which is highest in a 5th generation (5G) communication system.

20. The base station device of claim 11,
wherein the antenna device further includes a plurality of second antennas to radiate a signal on a second frequency band which is different from the frequency band,
wherein the base station device further comprises a second functional structure disposed between the first area of the cover frame and a second radiation area on which the plurality of second antennas is disposed,
wherein the functional structure comprises second functional layers having at least one material associated with the second frequency band, and
wherein the at least one material associated with the second frequency band is different from the at least one material associated with the frequency band.

* * * * *